US012290910B2

(12) United States Patent
Tago et al.

(10) Patent No.: US 12,290,910 B2
(45) Date of Patent: May 6, 2025

(54) WORK MACHINE

(71) Applicant: Koki Holdings Co., Ltd., Tokyo (JP)

(72) Inventors: Tatsuhiro Tago, Ibaraki (JP); Toshinori Yasutomi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 18/029,376

(22) PCT Filed: Oct. 8, 2021

(86) PCT No.: PCT/JP2021/037328
§ 371 (c)(1),
(2) Date: Mar. 30, 2023

(87) PCT Pub. No.: WO2022/075449
PCT Pub. Date: Apr. 14, 2022

(65) Prior Publication Data

US 2023/0381937 A1 Nov. 30, 2023

(30) Foreign Application Priority Data

Oct. 9, 2020 (JP) ................................ 2020-171099

(51) Int. Cl.
*B25C 1/00* (2006.01)
*B25C 1/06* (2006.01)

(52) U.S. Cl.
CPC ................ *B25C 1/06* (2013.01); *B25C 1/001* (2013.01)

(58) Field of Classification Search
CPC .. B25C 1/001; B25C 1/06; B25C 1/04; B25C 7/00; B25C 1/047; B25C 1/008
USPC ............................ 227/8, 130, 120, 136, 129
See application file for complete search history.

(56) References Cited

FOREIGN PATENT DOCUMENTS

| | | | | | |
|---|---|---|---|---|---|
| JP | 2003136431 | | | 5/2003 | |
| JP | 2008068357 | | | 3/2008 | |
| JP | 2008068357 | A | * | 3/2008 | ............... B25C 1/06 |
| JP | 2018103291 | | | 7/2018 | |
| JP | 2018103291 | A | * | 7/2018 | .............. B25C 1/04 |
| JP | 2018167340 | | | 11/2018 | |
| JP | 2019025577 | | | 2/2019 | |
| WO | 2016174995 | | | 11/2016 | |

OTHER PUBLICATIONS

"International Search Report (Form PCT/ISA/210) of PCT/JP2021/037328," mailed on Nov. 30, 2021, with English translation thereof, pp. 1-4.

* cited by examiner

*Primary Examiner* — Jacob A Smith
(74) *Attorney, Agent, or Firm* — JCIPRNET

(57) ABSTRACT

In a driver machine 10, a blank firing prevention mechanism 100 has a feeder position sensor 105 that detects the prohibition position of a feeder 64 of a magazine 60. When a control unit 20 detects the prohibition position of the feeder 64 on the basis of a detection signal from the feeder position sensor 105, the control unit 20 prohibits driving of a motor 52. Thus it is possible to prevent blank firing of a striking part 44. The feeder position sensor 105 is provided to an ejection part 34. Thus it is unnecessary for a wire, which connects the control unit 20 and the feeder position sensor 105, to be extended to the outside of a housing 14, in comparison with a structure in which the feeder position sensor 105 is provided in a magazine case 62 of the magazine 60.

11 Claims, 13 Drawing Sheets

WORK MACHINE

CROSS-REFERENCE TO RELATED APPLICATION

This application is a 371 application of the International PCT application serial no. PCT/JP2021/037328, filed on Oct. 8, 2021, which claims the priority benefits of Japan Patent Application No. 2020-171099, filed on Oct. 9, 2020. The entirety of each of the above-mentioned patent applications is hereby incorporated by reference herein and made a part of this specification.

TECHNICAL FIELD

The invention relates to a work machine.

RELATED ART

A driving tool (work machine) disclosed in Patent Document 1 as follows is provided with a blank firing mechanism, and is configured to prohibit a driving operation of the driving tool by using a blank firing mechanism in a case where the remaining number of fasteners is less than a predetermined number. In brief, such driving tool has a push lever, and, by pressing the push lever against a driven material, the control unit performs a driving operation of the driving tool when detecting an upward movement of the push lever. Meanwhile, in the case where the remaining number of fastener is less than the predetermined number, a feeder that supplies the fastener from a magazine interferes with the push lever. Accordingly, the upward movement of the push lever is prohibited, and the driving operation of the driving tool is prohibited. As a result, blank firing of the driving tool can be prevented.

CITATION LIST

Patent Literature

[Patent Literature 1] Japanese Laid-Open No. 2018-167340

SUMMARY OF INVENTION

Technical Problem

However, the above driving tool still has room for improvement in the aspect set forth in the following. That is, as described above, in the driving tool, the feeder and the push lever contact each other in the case where the remaining number of fasteners in the magazine is less than the predetermined number. Therefore, when the push lever is strongly pressed against the driven material, the push lever or the feeder may be damaged. Comparatively, for example, by providing a sensor (detection part) detecting the position of the feeder in the magazine, the remaining number of fasteners can be detected, while the damage to the push lever or the feeder can be suppressed.

However, in such case, the sensor is provided at the magazine attached to the driving tool body. Therefore, for example, a wiring material for connecting the sensor and the control unit of the driving tool, etc., is extended to the outside of the housing of the driving tool, and it is necessary to provide a structure capable of handling such wiring material. Accordingly, the structure of the driving tool may be complicated.

The invention has been made in view of the above, and an objective is to provide a work machine capable of avoiding blank firing with a simple structure.

Solution to Problem

According to one or more embodiments of the invention, a work machine includes: a body part, having an ejection part to which a fastener is supplied; a striking part, striking the fastener held by the ejection part toward a side of a first direction; a magazine part, having: a case attached to the body part and accommodating the fastener; and a feeder provided in the case to be movable in a second direction intersecting with the first direction and moving to a side of the second direction, thereby supplying the fastener to the ejection part; a feeder detection part, detecting a position of the feeder; and a control unit, controlling driving of the striking part, and, when the feeder detection part detects that the feeder is at a prohibition position, prohibiting striking of the striking part. The feeder detection part is provided at the ejection part.

According to one or more embodiments of the invention, the feeder detection part is disposed at a position overlapped with the feeder when viewed in the second direction.

According to one or more embodiments of the invention, in the work machine, at the ejection part, a feeder detected part is provided to be relatively movable in a direction of approaching and separating from the feeder detection part, the feeder detected part is disposed at a apart position apart from the feeder detection part by being biased by a biasing member, and, with the feeder moving to the prohibition position, moves to a close position close to the feeder detection part, and by detecting that the feeder detected part is at the close position, the feeder detection part detects that the feeder is at the prohibition position.

According to one or more embodiments of the invention, in the work machine, the feeder detected part is disposed between the feeder and the feeder detection part, and with the feeder pressing the feeder detected part when the feeder moves toward the prohibition position, the feeder detected part is moved from the apart position toward the close position.

According to one or more embodiments of the invention, in the work machine, the ejection part is provided with a pressing part configured to be movable in the first direction and a pressing detection part configured to be able to detect a position of the pressing part, and the control unit is configured to: when detecting that the pressing part is located at an initial position protruding toward the side of the first direction from the ejection part based on a detection signal of the pressing detection part, prohibit the striking of the striking part; and when detecting that the pressing part is located at a permission position displaced from the initial position toward an other side of the first direction based on the detection signal of the pressing detection part, permit the striking of the striking part.

According to one or more embodiments of the invention, in the work machine, the feeder detection part and the pressing detection part are provided at a detection substrate.

According to one or more embodiments of the invention, in the work machine, the feeder detection part is provided on a first surface of the detection substrate, and the pressing detection part is provided on a second surface of the detection substrate.

According to one or more embodiments of the invention, in the work machine, a pressing detected part is linked with the pressing part to be integrally movable in the first direction, and the pressing detection part detects a movement of the pressing detected part to the permission position, and the ejection part is provided with a guide part guiding a movement of the pressing detected part toward the first direction.

According to one or more embodiments of the invention, in the work machine, the guide part has a pair of rail parts, the pair of rail parts extend in the first direction and are disposed to be opposite to each other in a third direction orthogonal to the first direction, and a portion of the pressing detected part is disposed between the pair of rail parts in the third direction.

According to one or more embodiments of the invention, in the work machine, the pressing detected part is provided with a magnet, and the pressing detection part is a magnetic sensor and detects the permission position of the pressing part by detecting approaching of the magnet.

According to one or more embodiments of the invention, in the work machine, the pressing part is configured by including: a first pressing part, abutting against a driven material at a time of striking of the fastener; a second pressing part, abutting against the ejection part at the initial position to stop a movement of the pressing part toward the side of the first direction; and an adjustment member, changing relative positions between the first pressing part and the second pressing part in the first direction, a portion of the pressing detected part is disposed between the pair of rail parts in the third direction.

Effects of Invention

According to one or more embodiments of the invention, it is possible to avoid blank firing with a simple structure.

DESCRIPTION OF EMBODIMENTS

Figure 1:
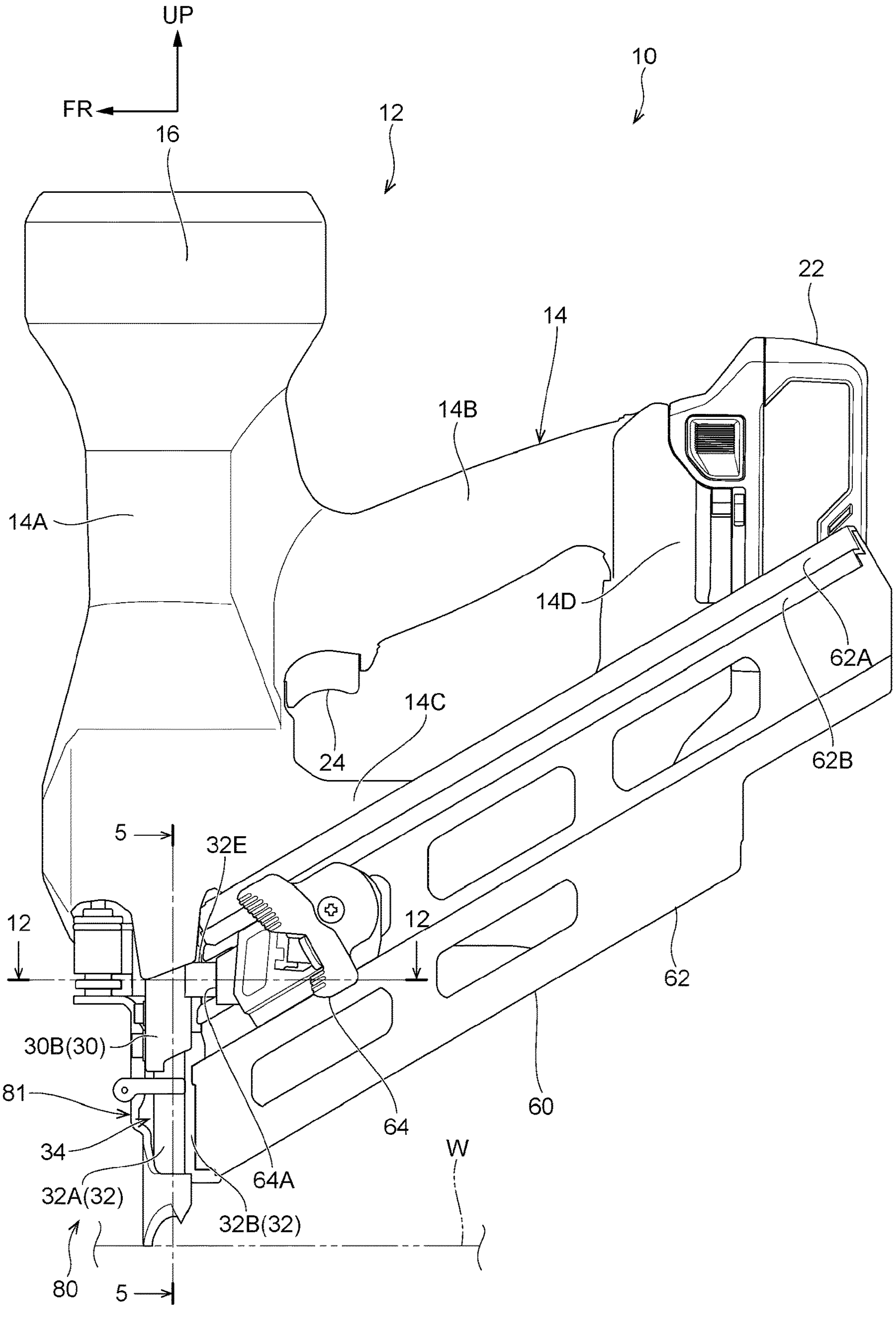
FIG. 1 is a side view illustrating a driving tool according to an embodiment when viewed from the left side.

In the following, a driving tool 10, as a work machine according to an embodiment, is described with reference to the drawings. An arrow UP, an arrow FR, and an arrow RH appropriately shown in the drawings indicate the upper side, the front side, and the right side of the driving tool 10, respectively. In the following description, when the upper-lower, front-rear, and left-right directions are used, these expressions indicate the upper-lower, front-rear, and left-right directions of the driving tool 10, unless otherwise specified. In addition, the upper-lower direction corresponds to the first direction of the invention, and the lower side corresponds to a side of the first direction of the invention.

Figure 2:
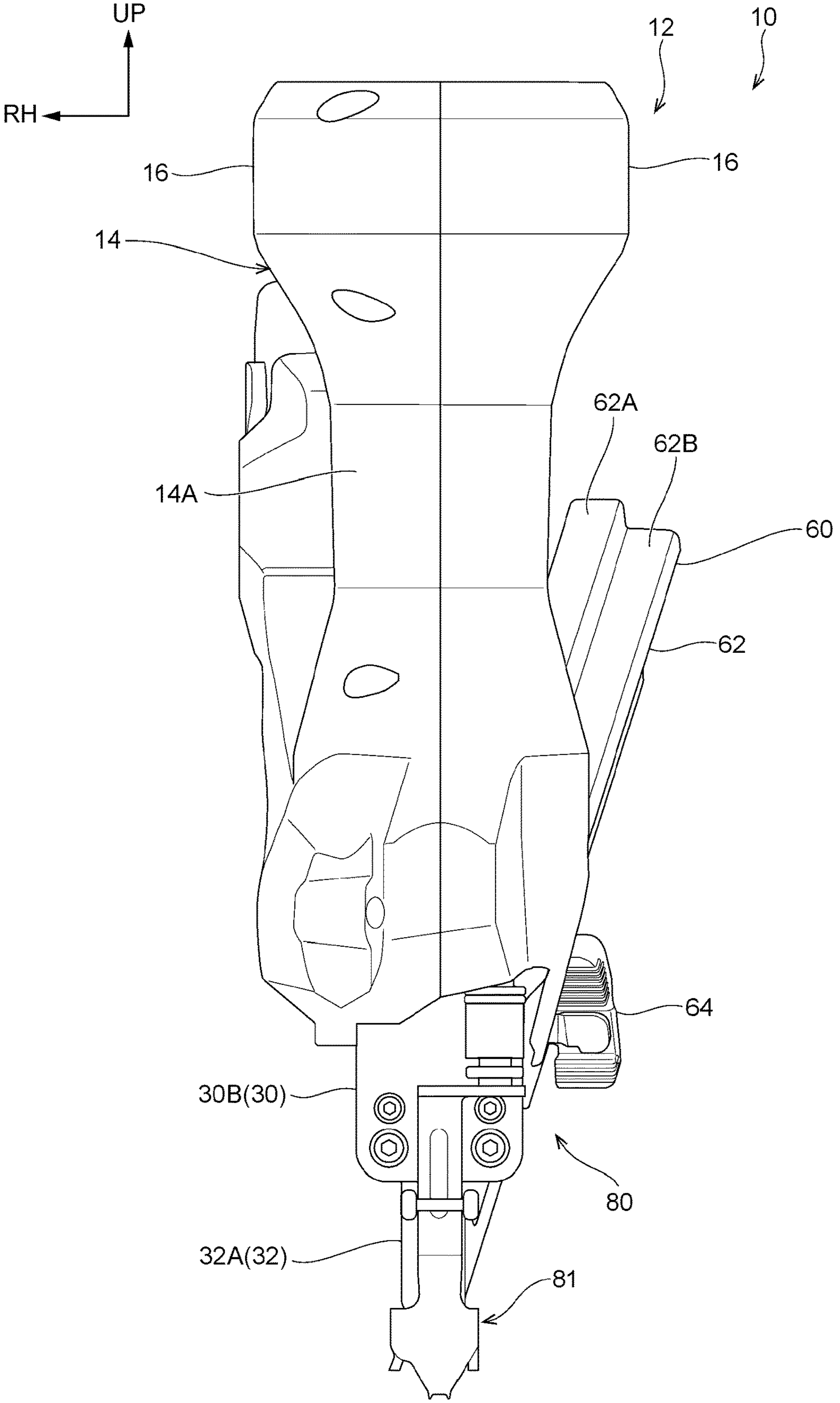
FIG. 2 is a front view when viewed from the front side of the driving tool shown in FIG. 1.
Figure 3:
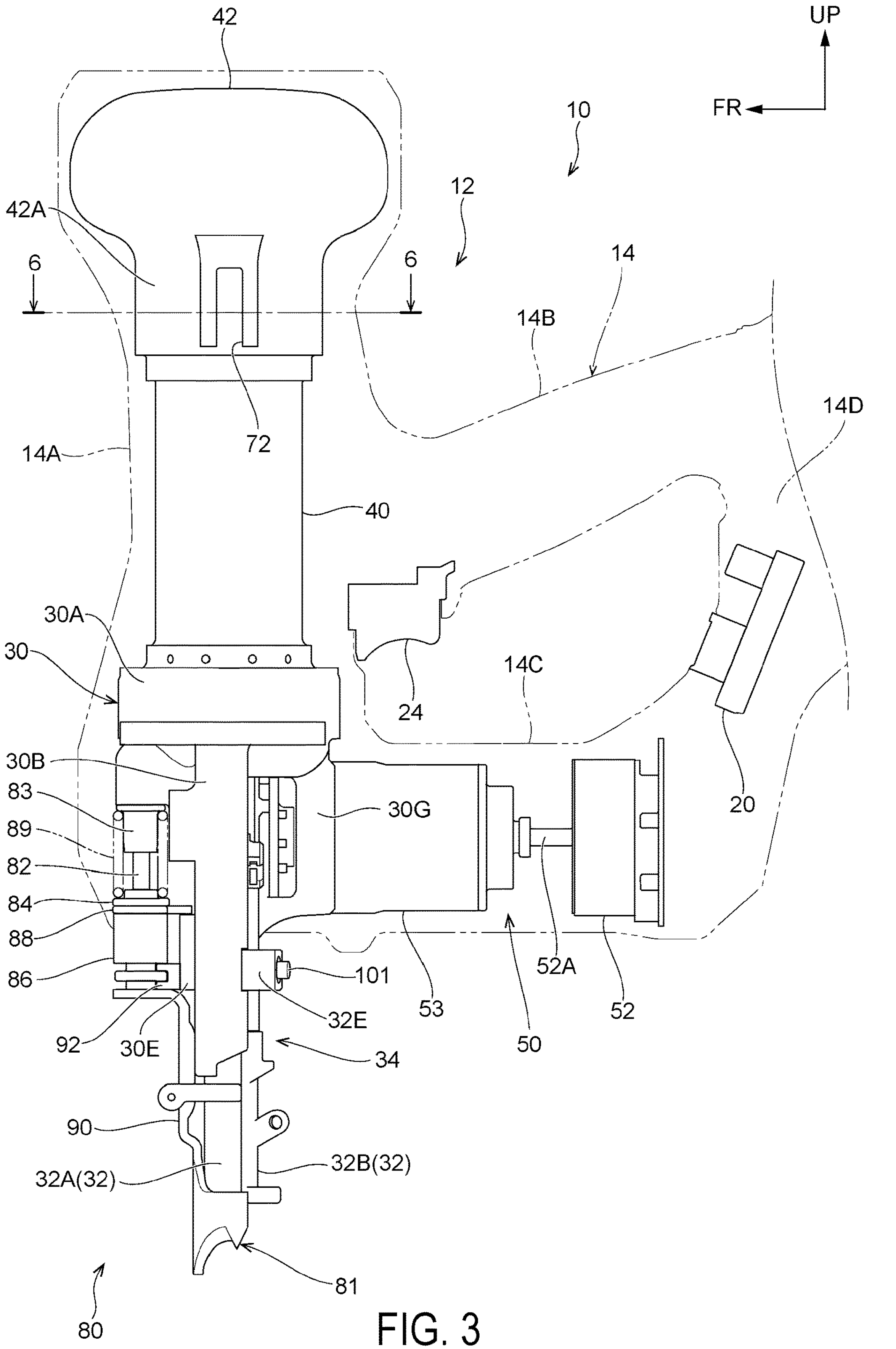
FIG. 3 is a side view illustrating the interior of a housing of the driving tool shown in FIG. 1 when viewed from the left side.

As shown in FIGS. 1 to 3, the driving tool 10 is provided with a driving tool body 12 as the body part, and a magazine 60 is assembled to the driving tool body 12. In addition, nails N as fasteners filled in the magazine 60 are supplied to the driving tool body 12, and are driven into a driven material W by using the driving tool body 12.

The driving tool body 12 is formed by including a housing 14, a nose 30, a cylinder 40, an accumulator container 42, and a driving mechanism 50. In addition, the driving tool body 12 is provided with a loosening prevention mechanism 70 (see FIG. 6), a driving depth adjustment mechanism 80 (see FIGS. 8 to 11), and a blank firing prevention mechanism 100 (see FIGS. 12 and 13). In the following, the respective configurations of the driving tool 10 are described.

(Regarding the housing 14) When viewed in a side view from the left side, the housing 14 is formed in a hollow, substantially inverted P shape. Specifically, the housing 14 is formed by including a body housing part 14A extending in the upper-lower direction, a handle part 14B obliquely extending upward from an intermediate part of the body housing part 14A in the upper-lower direction, and a motor housing part 14C extending toward the rear side from the lower end of the body housing part 14A. In addition, the rear end of the motor housing part 14C is bent upward and connected with the rear end of the handle part 14B. In addition, the housing 14 is formed by a housing member 16 divided into two in the left-right direction, and is formed by assembling the housing members 16 to each other.

In the rear end of the motor housing part 14C, a control unit 20 controlling a motor 52 to be described afterwards and controls the driving of a striking part 44 to be described afterwards is provided. In addition, the rear end of the handle part 14B is formed as a battery installation part 14D, and a battery 22 is detachably installed to the battery installation part 14D. The battery 22 is electrically connected with the control unit 20, and is configured to supply power from the battery 22 to the control unit 20.

A trigger 24 is provided inside the front end of the handle part 14B. The trigger 24 protrudes toward the lower side from the handle part 14B and is configured to be operable by being pulled upward. In addition, a trigger switch (not shown) is provided on the upper side of the trigger 24 inside the front end of the handle part 14B. It is configured that, when the trigger 24 is operated by being pulled, the trigger switch is pressed, and a detection signal is output from the trigger switch to the control unit 20. In addition, it is configured that, based on the detection signal from the trigger switch, the control unit 20 detects an operation with respect to the trigger 24.

(Regarding the nose 30) As shown in FIGS. 1 to 5 and 8 to 13, the nose 30 is made of metal, and is disposed in the lower end of the body housing part 14A. The nose 30 is formed by including a nose attachment cylindrical part 30A forming the upper end of the nose 30 and an ejection part body 30B extending from the nose attachment cylindrical part 30A to the lower side. The nose attachment cylindrical part 30A is formed in a bottomed cylindrical shape open to the upper side, and a female screw 30H is formed on the inner circumferential surface of the sidewall of the nose attachment cylindrical part 30A. An ejection hole 30C is formed to penetrate through the central part of the bottom wall of the nose attachment cylindrical part 30A. A bumper 36 (see FIGS. 4 and 5) in a substantially cylindrical shape is accommodated in the nose attachment cylindrical part 30A. In addition, when the striking part 44 to be described afterwards is lowered from a upper dead center to a lower dead center, the striking part 44 collides with the bumper 36, and the physical energy of the striking part 44 is absorbed by the bumper 36.

Figure 12:
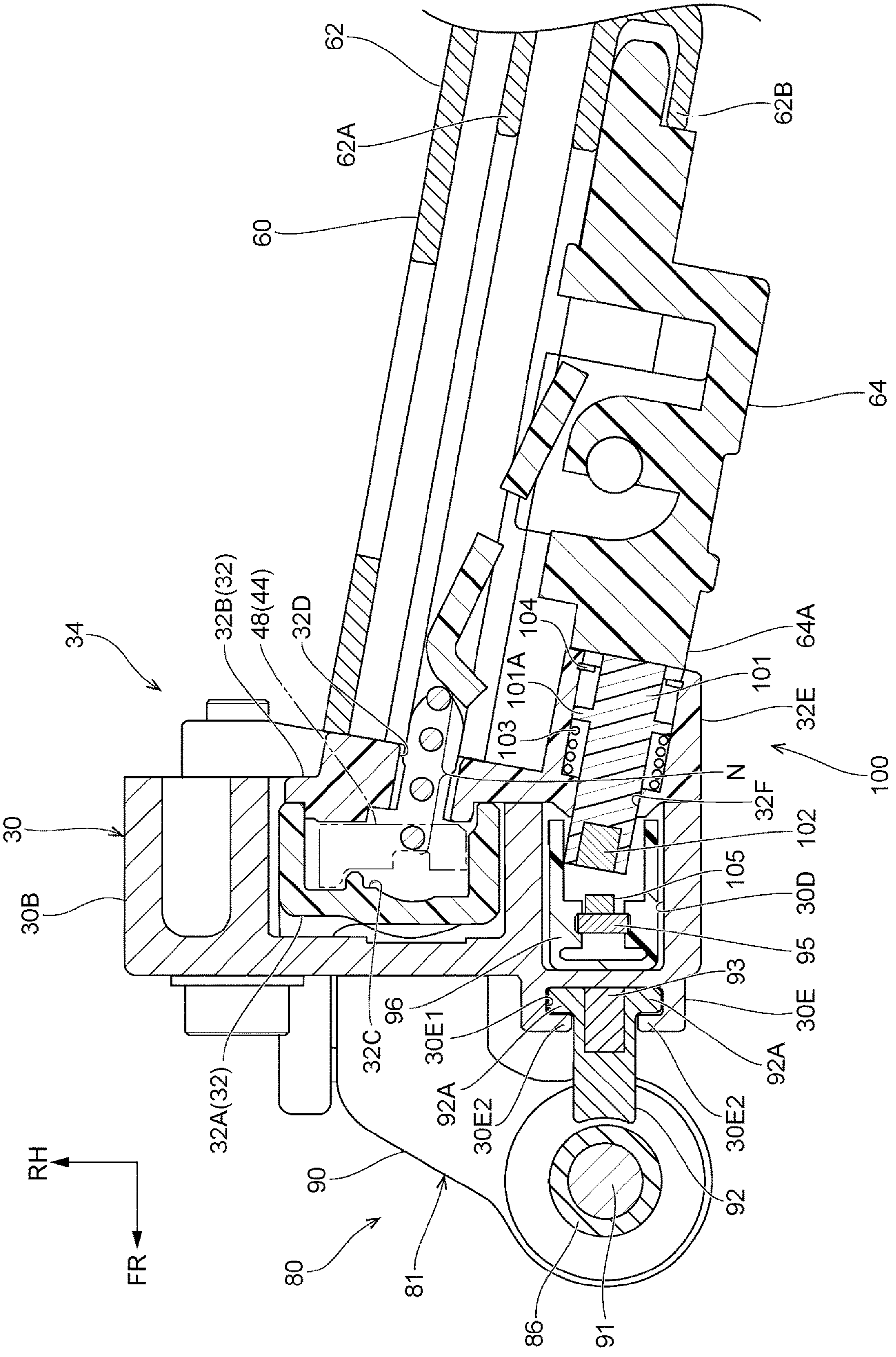
FIG. 12 is a cross-sectional view (cross-sectional view along a line 12-12 of FIG. 1) illustrating the periphery of the ejection part of the driving tool shown in FIG. 1 when viewed from the upper side.
Figure 13:
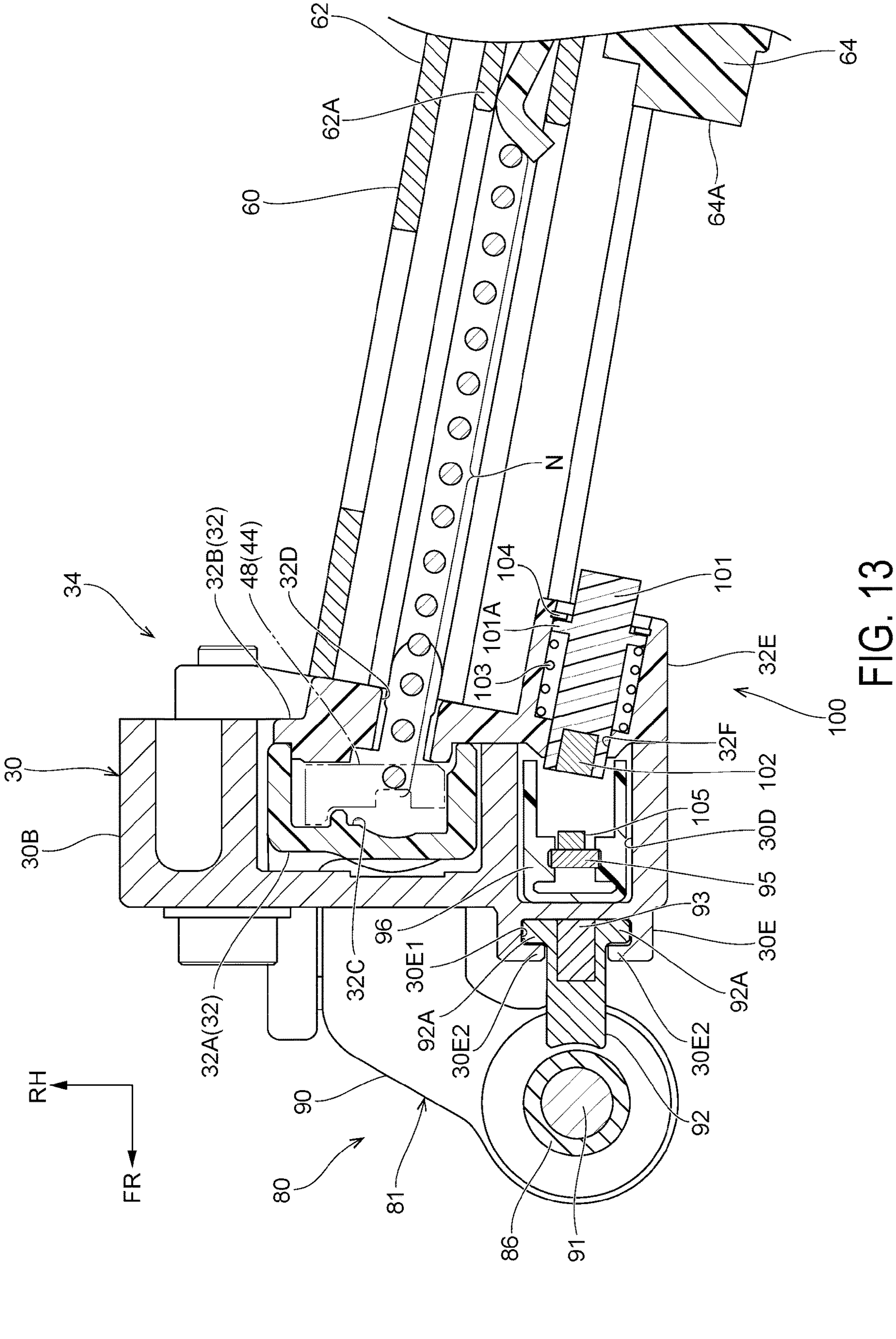
FIG. 13 is a cross-sectional view illustrating a state in which a feeder of a magazine shown in FIG. 12 is displaced, by using a nail, from a prohibition position to the other side in an inclination direction in correspondence with FIG. 12.

The ejection part body 30B extends from the nose attachment cylindrical part 30A to the lower side and protrudes from the body housing part 14A to the lower side. A blade guide 32 is provided at the ejection part body 30B. That is, with the ejection part body 30B and the blade guide 32, an ejection part 34 emitting the nail N to the lower side is formed. The blade guide 32 is formed in a substantially rectangular tubular shape extending in the upper-lower direction, and is disposed on the lower side of the ejection hole 30C. In addition, the blade guide 32 is formed by a front blade guide member 32 forming the front part of the blade guide 32 and a rear blade guide 32B forming the rear part of the blade guide 32. The front blade guide member 32A and the rear blade guide member 32B are fastened and fixed to the ejection part body 30B. As shown in FIGS. 12 and 13, the interior of the blade guide 32 is formed as an ejection path 32C, and the ejection hole 30C is disposed on the upper side of the ejection path 32C. In addition, a guide slit 32D extending in the upper-lower direction is formed to penetrate through the rear blade guide 32B, and the ejection path 32C is open to the rear side through the guide split 32D. Specifically, when viewed in a top view, the guide slit 32D is open to a direction slightly inclined diagonally rearward toward the left.

Figure 9:
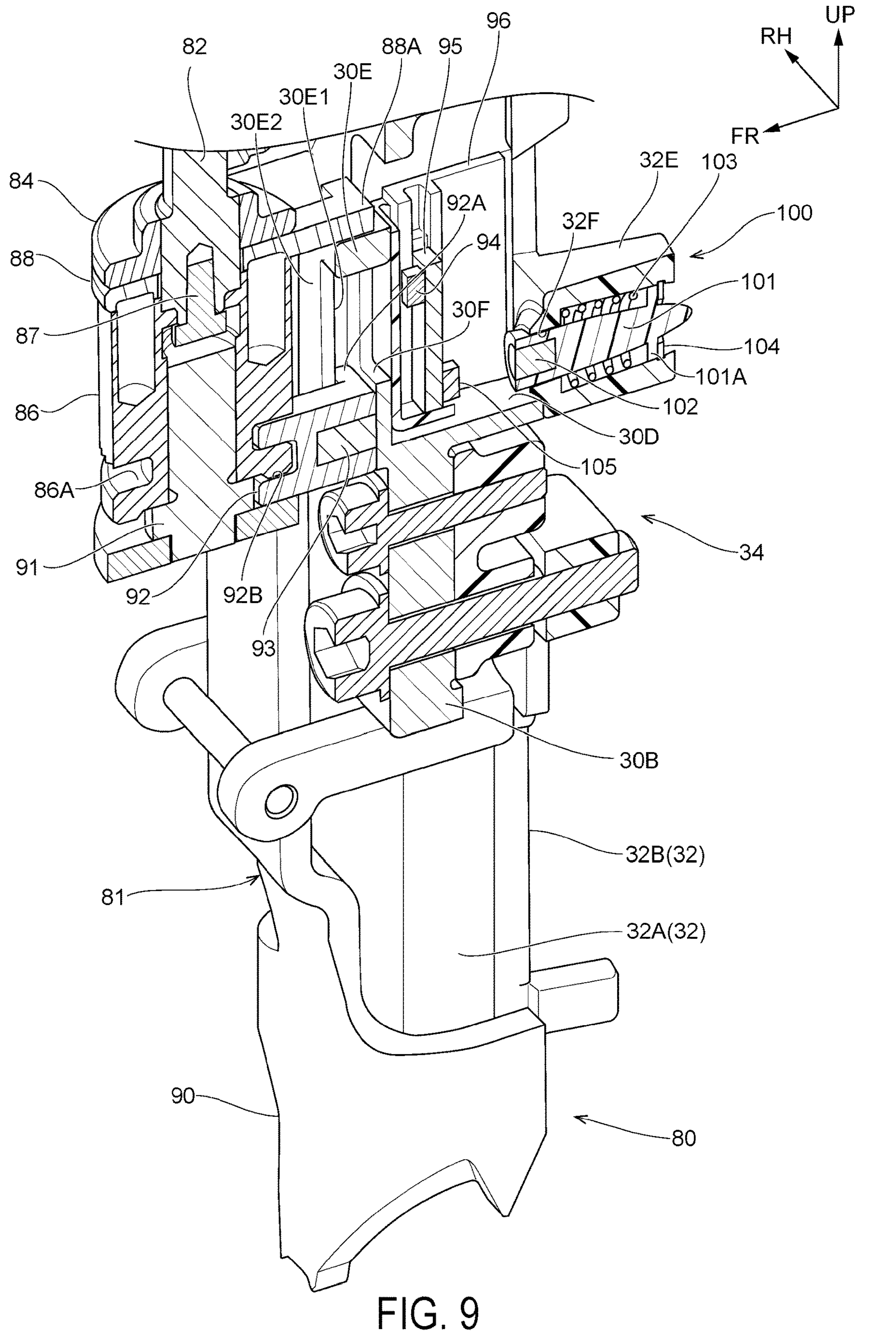
FIG. 9 is a perspective view in which a portion of the periphery of the ejection part shown in FIG. 8 is broken.

As shown in FIGS. 9, 12, and 13, in the rear guide blade 32B and on the left side of the ejection path 32C, a lever accommodation part 32E accommodating a feeder detection lever 101 to be described afterwards is provided. The lever accommodation part 32E is formed in a substantially bottomed rectangular tubular shape open to the rear side. In addition, the lever accommodation part 32E is disposed in adjacency with the rear side of the ejection part body 30B. An insertion hole 32F in a circular shape is formed to penetrate through the bottom wall (front wall) of the lever accommodation part 32E. When viewed in a top view, the axis of the lever accommodation part 32E is slightly inclined diagonally rearward toward the left.

In addition, in the ejection part body 30B and on the front side of the lever accommodation part 32E, a substrate accommodation part 30D for accommodating a sensor substrate 95 to be described afterwards is formed. The substrate accommodation part 30D is formed in a concave shape open to the rear side. The interior of the substrate accommodation part 30D and the interior of the lever accommodation part 32E are in communication with each other through the insertion hole 32F. In addition, on the front surface of the ejection part body 30B and on the front side of the substrate accommodation part 30D, a guide rail 30E as a guide part protruding forward is formed. The guide rail 30E forms a portion of the driving depth adjustment mechanism 80 to be described afterwards. The guide rail 30E, when viewed from the front side, is formed in a substantially rectangular shape with the upper-lower direction as the longitudinal direction. A guide groove 30E1 is formed in the guide rail 30E. The guide groove 30E1 extends in the upper-lower direction and is open to the front side, and is formed as a substantially T-shaped groove when viewed from the lower side. Accordingly, on the two sides of the opening part of the guide groove 30E1 in the left-right direction, a pair of rail parts 30E2 are formed. In addition, the guide groove 30E1 is open to the lower side. Moreover, a sensor hole 30F (see FIGS. 9 to 11) communicating between the guide groove 30E1 and the substrate accommodation part 30D is formed to penetrate through the ejection part body 30B. The sensor hole 30F is formed in a substantially elongated hole extending in the upper-lower direction.

Figure 5:
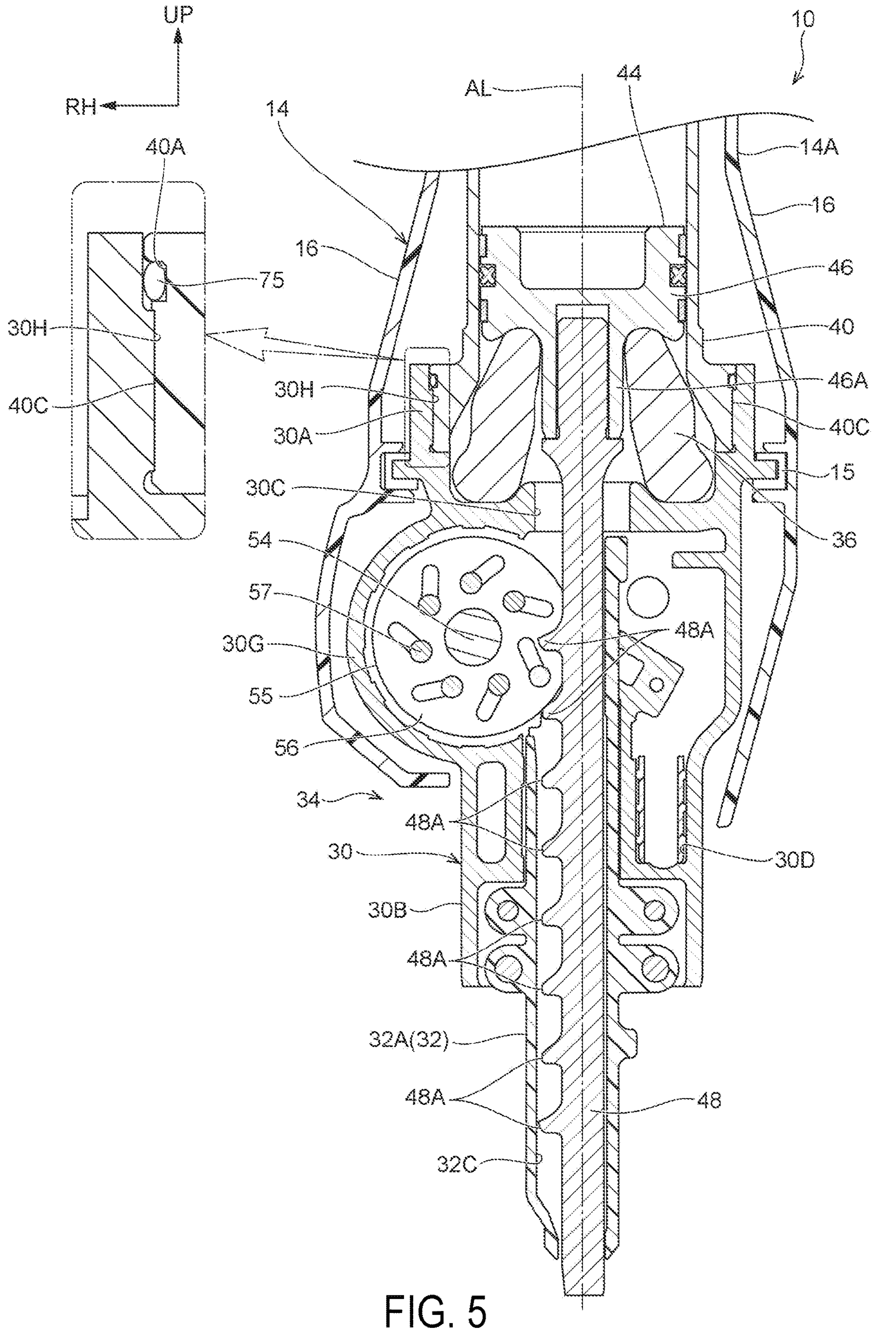
FIG. 5 is a cross-sectional view (cross-sectional view along a line 5-5 of FIG. 1) illustrating the periphery of an ejection part of the driving tool shown in FIG. 1 when viewed from the front side.
Figure 8:
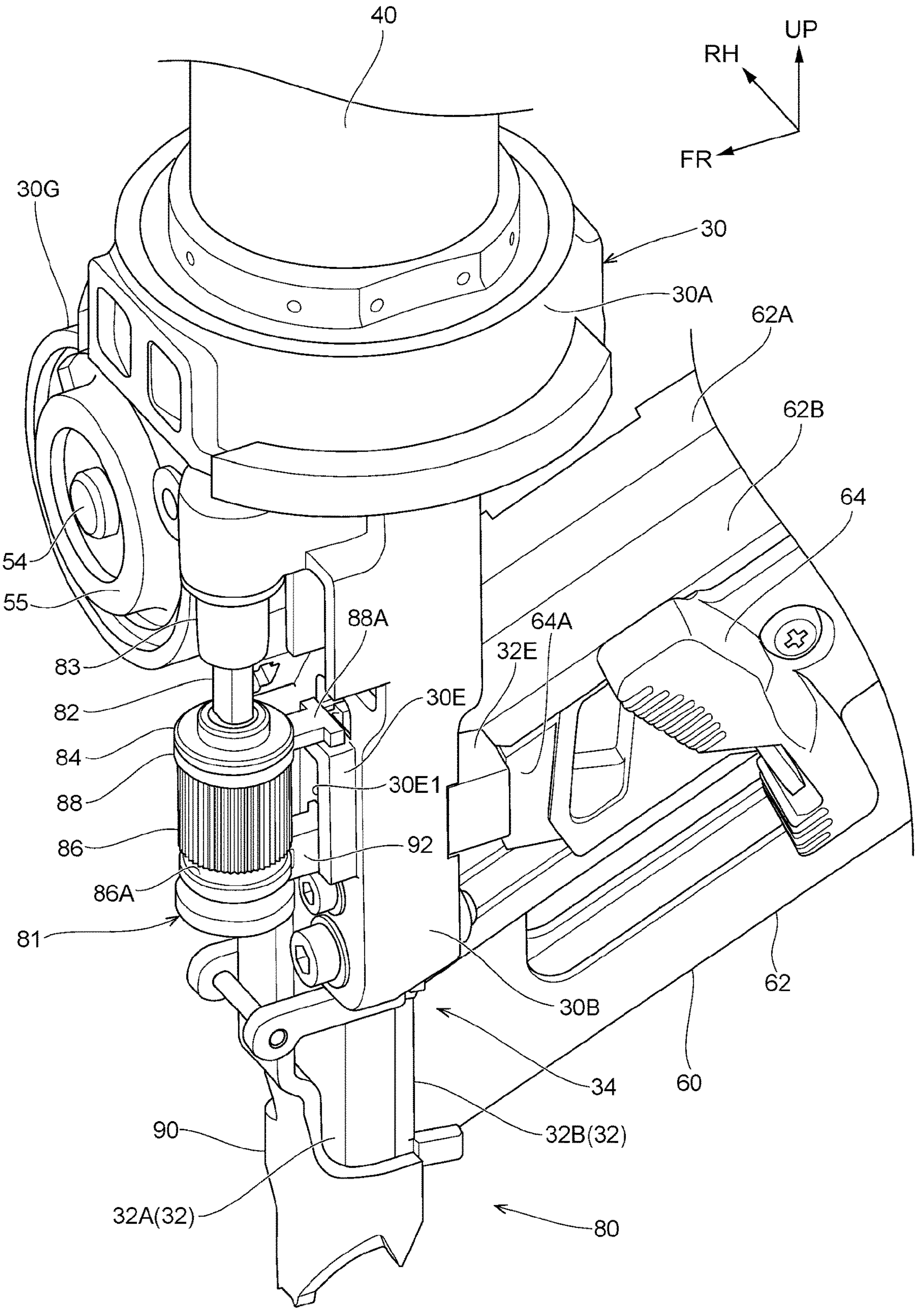
FIG. 8 is a perspective view illustrating the periphery of the ejection part of the driving tool shown in FIG. 3.

As shown in FIGS. 5 and 8, at the right part of the upper end of the ejection part body 30B, a converter accommodation part 30G accommodating a converter to be described afterwards is formed. The converter accommodation part 30G is formed in a cylindrical shape with the front-rear direction as the axial direction. In addition, in the accommodation state of the nose 30 to the body housing part 14A, the housing 14 is attached to the nose 30 so as to be not movable about a central axis AL of the nose attachment cylindrical part 30A. An elastic body 15 formed by synthetic resin, such as rubber, is interposed between the housing 14 and the nose 30.

Figure 4:
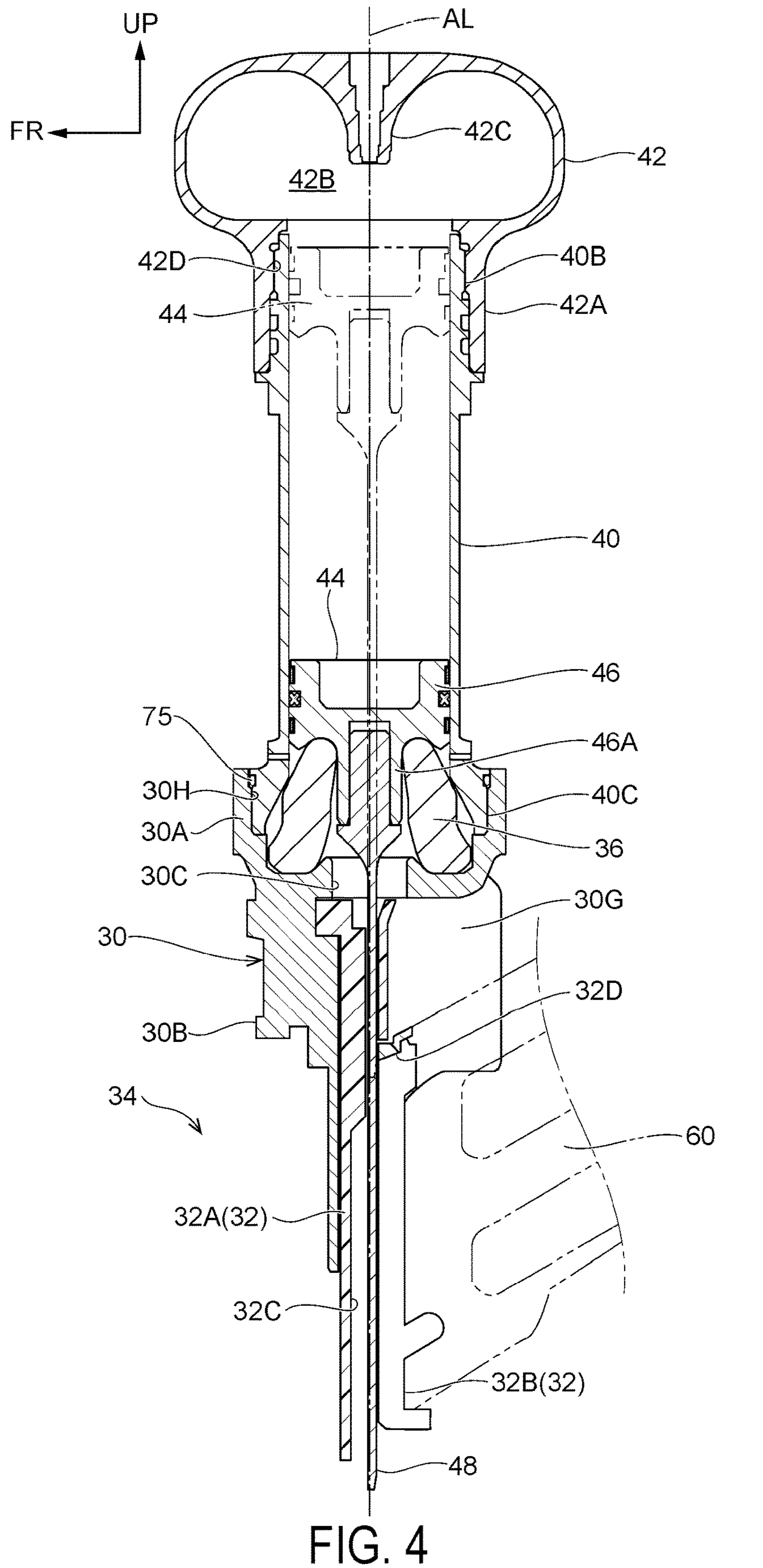
FIG. 4 is a cross-sectional view illustrating a state in which a nose, a cylinder, and an accumulator container shown in FIG. 3 are combined when viewed from the left side.

(Regarding the cylinder 40) As shown in FIGS. 3 to 5, the cylinder 40 is formed in a substantially cylindrical shape with the upper-lower direction as the axial direction, and is disposed in the body housing part 14A on the upper side of the nose 30. Specifically, the cylinder 40 is disposed coaxially with the nose attachment cylindrical part 30A, and the central axis of the cylinder 40 conforms to the central axis AL of the nose attachment cylindrical part 30A. A male screw thread 40B is formed on the outer circumferential part of the upper end of the cylinder 40, and a male screw thread 40C is formed on the outer circumferential part of the lower end of the cylinder 40. In addition, the male screw thread 40C of the lower end of the cylinder 40 is screwed with the female screw thread 30H of the nose attachment cylindrical part 30A, and the cylinder 40 is linked with the nose attachment cylindrical part 30A. Specifically, the cylinder 40 rotates (in a clockwise direction when viewed from the upper side) to a side of the rotation direction about the central axis AL with respect to the nose 30, and the cylinder 40 is screwed with the nose attachment cylindrical part 30A. Accordingly, the cylinder 40 and the nose 30 are linked through screw connection.

(Regarding the accumulator container 42) As shown in FIGS. 3 and 4, the accumulator container 42 is formed in a bottomed cylindrical shape open to the lower side. The lower part of the accumulator container 42 is formed as a container attachment cylindrical part 42A. The container attachment cylindrical part 42A is formed in a cylindrical shape with the upper-lower direction as the axial direction. A female screw thread 42D is formed on the inner circumferential surface of the container attachment cylindrical part 42A. In addition, the female screw thread 42D of the container attachment cylindrical part 42A is screwed with the male screw thread 40B of the upper end of the cylinder 40, and the accumulator container 42 is linked with the cylinder 40. Specifically, the accumulator container 42 rotates to a side of the rotation direction about the central axis AL with respect to the cylinder 40, and the accumulator container 42 is screwed with the cylinder 40. Accordingly, the accumulator container 42 and the cylinder 40 are linked through screw connection. In addition, the accumulator container 42 is disposed coaxially with the cylinder 40, and the central axis of the accumulator container 42 conforms to the central axis AL.

The upper part of the accumulator container 42 is formed with a diameter greater than that of the container attachment cylindrical part 42A. In addition, the interior of the accumulator container 42 is configured as a pressure chamber 42B, and the pressure chamber 42B is filled with gas. The gas filled in the pressure chamber 42B is air, inert gas, etc. In the embodiment, the pressure chamber 42B is filled with air. In addition, at the central part in the top wall of the accumulator container 42, a replenishment valve attachment part 42C protruding toward the lower side is formed. Accordingly, it is configured that a replenishment valve is attached to the replenishment valve attachment part 42C, and air can be replenished into the pressure chamber 42B.

Moreover, in the accumulator container 42, the shape when viewed in a vertical cross-section through which the central axis AL passes is the same in the circumferential direction of the accumulator container 42 in the portion excluding an engagement concave part 72 to be described afterwards. That is, the flat cross-sectional shape of the accumulator container 42 is formed to be circular in any position in the upper-lower direction. In addition, in the accommodation state of the accumulator container 42 in the body housing part 14A, the accumulator container 42 is configured to be movable about the central axis AL.

(Regarding the striking part 44) As shown in FIGS. 4 to 5, the striking part 44 is formed in an elongated shape extending in the upper-lower direction, and is accommodated in the cylinder 40 to be movable in the upper-lower direction. Specifically, the striking part 44 is configured to be movable between the upper dead center (the position indicated by a two-dot chain line in FIG. 4) and the lower dead center (the position indicated by a solid line in FIGS. 4 and 5) displaced downward from the upper dead center. The striking part 44 is formed by including a piston 46 forming the upper end of the striking part 44 and a driver blade 48 extending downward from the piston 46.

The piston 46 is formed in a substantially cylindrical columnar shape with the upper-lower direction as the axial direction, and the outer diameter of the piston 46 is set to be slightly smaller than the inner diameter of the cylinder 40. An attachment part 46A for attachment of the driver blade 48 to be described afterwards is formed at the central part of the piston 46. The attachment part 46A is formed in a substantially cylindrical shape with the upper-lower direction as the axial direction, and extends toward the lower side from the piston 46.

The blade driver 48 is formed in a substantially elongated shape extending in the upper-lower direction. The upper end of the driver blade 48 is fit into the attachment part 46A, and the driver blade 48 extends toward the lower side from the piston 46. In addition, the driver blade 48 is formed to be movable in the ejection path 32C of the nose 30, and it is configured that, with the striking part 44 moving from the upper dead center to the lower dead center, the nail N in the ejection path 32C is struck by the driver blade 48 from the upper side.

(Regarding the driving mechanism 50) As shown in FIGS. 3 and 5, the driving mechanism 50 is provided with a motor 52, a deceleration mechanism part 53, and a converter 55. The motor 52 is formed as a brushless motor, accommodated in the rear side of the motor housing part 14C, and electrically connected with the control unit 20. The motor 52 is provided with a driving shaft 52A with the front-rear direction as the axial direction. In addition, the front end of the driving shaft 52A is linked with the deceleration mechanism part 53 disposed on the front side of the motor 52. In addition, it is configured that the deceleration mechanism part 53 is linked with a rotation shaft 54 provided in the converter accommodation part 30G of the nose 30, and the rotation force of the motor 52 is transmitted to the rotation shaft 54 via the deceleration mechanism part 53.

The converter 55 is disposed in the converter accommodation part 30G. The converter 55 is configured as a mechanism part that transmits the rotation force of the rotation shaft 54 to the driver blade 48 and moves the driver blade 48 toward the upper side. The conversion part 55 is configured by including a pin wheel 56 fixed to the rotation shaft 54, multiple pinion pins 57 provided on the pin wheel 56, and multiple rack parts 48A formed at the driver blade 48. The pinion pins 57 are disposed at a predetermined interval in the circumferential direction of the rotation shaft 54, and the rack parts 48A are provided at a predetermined interval in the upper-lower direction.

In addition, the pinion pins 57 are configured to be able to engage with the rack parts 48A and remove the engagement with the rack parts 48A. In addition, it is configured that, by rotating the pin wheel 56 to engage the pinion pins 57 with the rack parts 48A, the driver blade 48 moves toward the upper side. Meanwhile, it is configured that, by removing the engagement state between the pinion pins 57 and the rack parts 48A, the striking part 44 is lowered by the pressure inside the pressure chamber 42B.

(Regarding the magazine 60) As shown in FIGS. 1, 2, 4, 8, 12, and 13, the magazine 60 is configured by including a magazine case 62 as the case and a feeder 64 provided at the magazine case 62. The magazine case 62 is formed in a substantially elongated flat shape with the left-right direction as the thickness direction. When viewed from the left side, the magazine case 62 extends in a direction inclined upward toward the rear side (referred to as "inclination direction" in the following). The magazine case 62 is disposed in adjacency with the left side of the motor housing part 14C, the front end of the magazine case 62 is attached to the ejection part body 30B of the nose 30, and the rear end of the magazine 60 is fixed to the motor housing part 14C. When viewed from the upper side, the magazine case 62 is inclined diagonally rearward toward the left to a certain extent (see FIGS. 12 and 13).

In the magazine case 62, a first guide rail 62A and a second guide rail 62B extending along the inclination direction are formed. The nails N are filled in the first guide rail 62A, and the interior of the first guide rail 62A is configured as an accommodation part accommodating the nails N (see FIGS. 12 and 13). In addition, the interior of the first guide rail 62A is in communication with the ejection path 32C via the guide slit 32D of the ejection part 34. The feeder 64 for supplying the nail N to the ejection path 32C is relatively movably attached to the second guide rail 62B. The feeder 64 is biased toward the front end side (a side of the inclination direction, a direction toward the ejection part 34) by a biasing spring not shown herein. Accordingly, it is configured that the nail N is supplied into the ejection path 32C of the ejection part body 30B by the feeder 64.

In addition, at the front end of the feeder 64, a pressing part 64A for pressing the feeder detection lever 101 to be described afterwards is formed. Moreover, the lever accommodation part 32E is disposed in the front end of the second guide rail 62B. In addition, when the remaining number of the nails N is equal to or less than the predetermined number (four in the configuration of the embodiment), the pressing part 64A presses the feeder detection lever 101 to be described afterwards to a side of the inclination direction to abut against the lever accommodation part 32E (the position shown in FIGS. 1, 8, and 12, the position of the feeder 64 is referred to as a prohibition position). Meanwhile, when the remaining number of the nails N is more than the predetermined number, the feeder 64 is disposed on the other side of the inclination direction with respect to the prohibition position by the nails N, and the pressing part 64A is apart from the lever accommodation part 32E (see FIG. 13).

Figure 6:
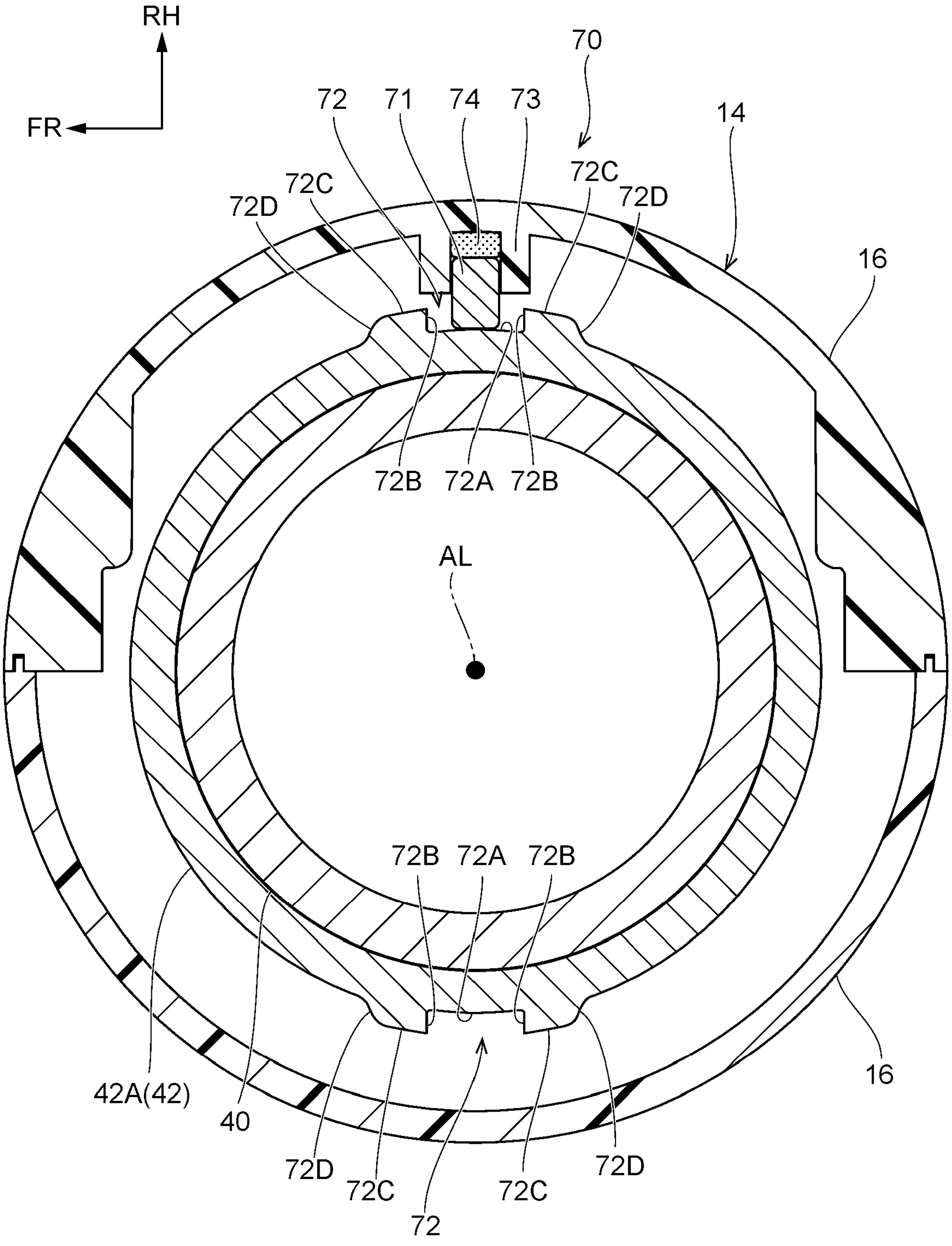
FIG. 6 is a plan cross-sectional view (cross-sectional view along a line 6-6 of FIG. 3) of the upper part of a housing body part of the driving tool shown in FIG. 3.

(Regarding the loosening prevention mechanism 70) The loosening prevention mechanism 70 is configured as a mechanism that maintains the combination state between the nose 30 and the cylinder 40 and the combination state between the cylinder 40 and the accumulator container 42. As shown in FIG. 6, the loosening prevention mechanism 70 is configured as including an engagement pin 71 as the engagement member provided in the body housing part 14A of the housing 14 and the engagement concave parts 72 as a pair of engaged parts formed on the outer circumferential part of the container attachment cylindrical part 42A of the accumulator container 42.

On the inner circumferential surface of the body housing part 14A, and on the radially outer side of the container attachment cylindrical part 42A in the accumulator container 42, a pin accommodation part 73 for accommodating the accommodation pin 71 is formed. The pin accommodation part 73 is formed in a substantially cylindrical shape with the radial direction of the accumulator container 42 as the axial direction. The pin accommodation part 73 is formed in the housing member 16 on a side (right side) of the housing 14, and is disposed at the right end of the body housing part 14A.

The engagement pin 71 is formed in a substantially cylindrical columnar shape with the radial direction of the accumulator container 42 as the radial direction, and is movably accommodated in the pin accommodation part 73 of the body housing part 14A. In addition, in the pin accommodation part 73, an elastic body 74 for biasing the engagement pin 71 toward the radially inner side of the accumulator container 42 is accommodated. The elastic body 74 is formed by an elastic member, such as a compression spring, rubber. Accordingly, an end of the engagement pin 71 (the end on the side of the accumulator container 42) is configured to abut against the outer circumferential part of the container attachment cylindrical part 42A of the accumulator container 42.

The engagement concave part 72 is formed on the outer circumferential part of the container attachment cylindrical part 42A of the accumulator container 42. The engagement concave part 72 includes a flat part 72A and wall parts 72B disposed on two sides of the flat part 72A in the circumferential direction of the container attachment cylindrical part 42A, and is formed in a concave shape open to the radially outer side of the accumulator container 42. In addition, the engagement concave part 72 is formed in a groove shape extending in the upper-lower direction (see FIG. 3). The flat part 72A extends in a circumferential direction facing toward the radial direction of the container attachment cylindrical part 42A. The wall part 72B extends in the radial direction to face toward the circumferential direction of the container attachment cylindrical part 42A, and is disposed to stand vertically with respect to the flat part 72A. A pair of the engagement concave parts 72 are disposed to be 180 degrees apart in the circumferential direction of the accumulator container 42. In addition, at a predetermined position (the position is referred to as "engagement position" in the following) in the circumferential direction (rotation direction) of the accumulator container 42, the engagement concave part 72 and the engagement pin 71 are set to be disposed to be opposite to each other in the radial direction of the accumulator container 42. That is, in the embodiment, as shown in FIG. 6, at the engagement position of the accumulator container 42, one of the engagement concave parts 72 is located to open to the right side. In addition, it is configured that, at the position, an end of the engagement pin 71 is engaged with the engagement concave part 72, and the rotation about the central axis AL in the accumulator container 42 is limited. Specifically, it is assumed that when the accumulator container 42 rotates relatively with respect to the housing 14, the engagement pin 71 abuts against the wall part 72B. The wall part 72B stands vertically with respect to the flat part 72A, and the engagement pin 71 cannot climb over the wall part 72B. Therefore, the outward movement of the engagement concave part 72 is limited, and the rotation about the central axis AL in the accumulator container 42 is limited.

Figure 7:
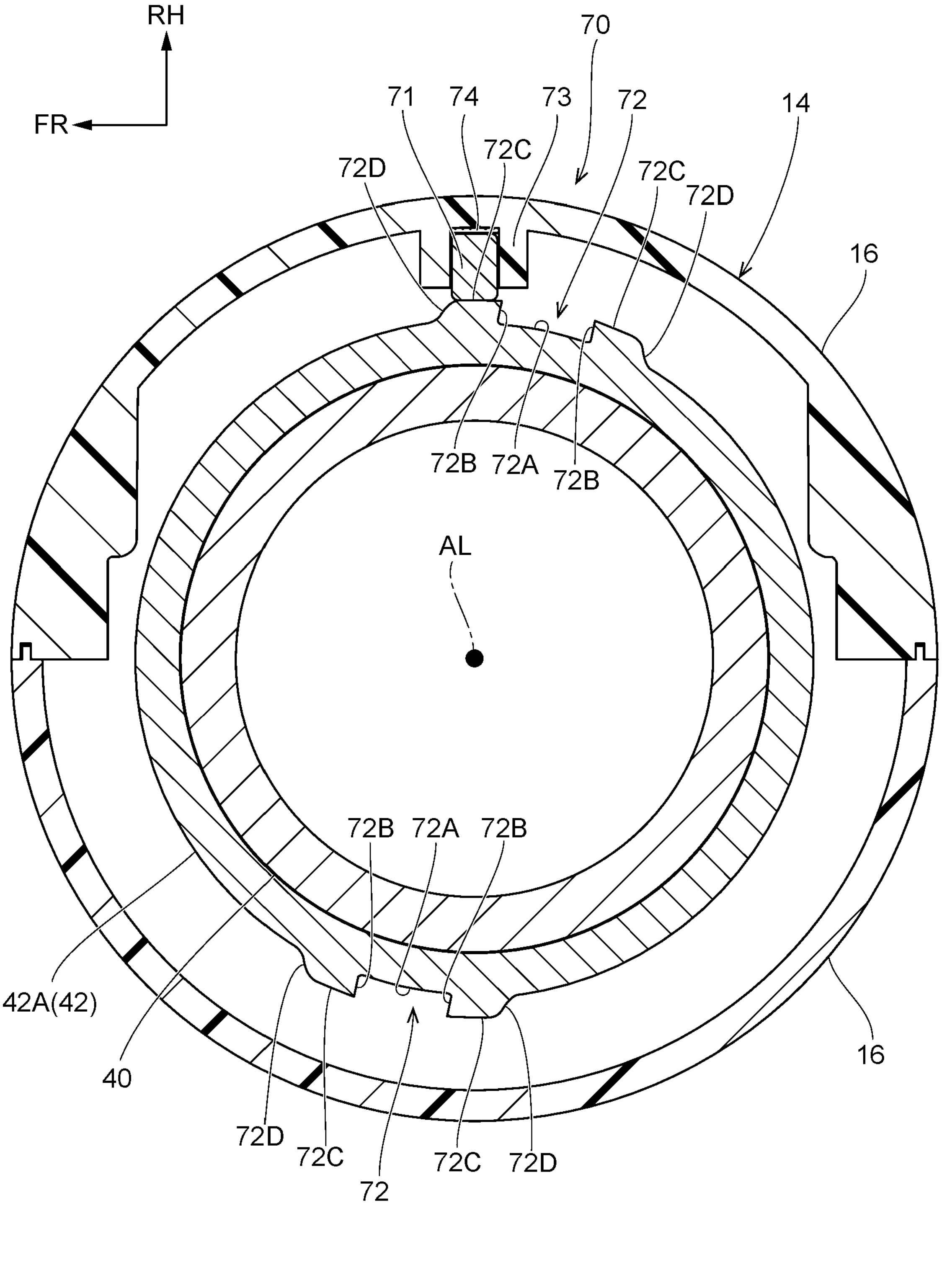
FIG. 7 is a plan cross-sectional view illustrating a state in which the cylinder and the accumulator container are rotated relatively with respect to the housing body from the state shown in FIG. 6.

In addition, the outer circumferential edge part in the engagement concave part 72 includes a raised part 72C raised to a certain extent toward the radially outer side of the accumulator container 42 and an inclination part 72D connecting a portion in the outer circumferential surface of the container attachment cylindrical part 42A other than the engagement concave part 72 and the raised part 72C. The raised part 72C extends in a circumferential direction facing toward the radial direction of the container attachment cylindrical part 42A. The inclination part 72D is inclined with respect to the circumferential direction of the container attachment cylindrical part 42A, and the angle with respect to the container attachment cylindrical part 42A is smaller than that with respect to the wall part 72B. In addition, as shown in FIG. 7, in the case where the position of the accumulator container 42 in the assembled state is deviated from the engagement position to the circumferential direction of the accumulator container 42, the engagement pin 71 is displaced toward the radially outer side by being pressed by the outer circumferential part of the container attachment cylindrical part 42A, and the elastic body 74 is compressed and deformed.

In addition, as shown in FIG. 5, in the outer circumferential part of the lower end of the cylinder 40, a groove part 40A is formed at a position opposite to the upper end of the nose attachment cylindrical part 30A of the nose 30 in the radial direction. The groove part 40A is formed along the circumferential direction of the cylinder 40 throughout the entirety of the cylinder 40 in the circumferential direction. A rotation suppression member 75 in a ring shape is provided at the groove part 40A, and the rotation suppression member 75 is configured by a member with an elastic property. In addition, in the compressed and deformed state, the rotation suppression member 75 is disposed between the cylinder 40 and the nose attachment cylinder part 30A.

(Regarding the driving depth adjustment mechanism 80) As shown in FIGS. 8 to 11, the driving depth adjustment mechanism 80 is configured as a mechanism for regulating the driving depth of the nail N into the driven material W. The driving depth adjustment mechanism 80 is configured as including a push lever unit 81 as a pressing part, a detection slider 92 as a pressing detected part, and a lever position sensor as a pressing detection part.

The push lever unit 81 is formed, as a whole, in a substantially elongated shape extending in the upper-lower direction. In addition, the push lever unit 81 is disposed on the front side of the ejection part body 30B of the nose 30 and linked with the ejection part body 30B to be relatively movable in the upper-lower direction. Specifically, the push lever unit 81 is configured to be movable between the initial position (the position indicated in FIGS. 3 and 10) and the permission position (the position indicated in FIG. 11) displaced to the upper side from the initial position. In addition, the description is made with the state in which the push lever unit 81 is disposed at the initial position.

The push lever unit 81 is configured as including a linking shaft 82, an adjuster 86 as an adjustment member, a stopper plate 88 as a second pressing part, and a push lever 90 as a first pressing part. The linking shaft 82 forms the upper end of the push lever unit 81. The linking shaft 82 is formed in a substantially rectangular columnar shape extending in the upper-lower direction, and is disposed on the front side of the upper end of the ejection part body 30B. In addition, the upper end of the linking shaft 82 is inserted into a support cylinder 83 in a cylindrical shape fixed to the nose 30 to be relatively movable in the upper-lower direction. Accordingly, the linking shaft 82 is linked with the nose 30 to be relatively movable in the upper-lower direction. A spring receiving member 84 is provided at the lower end side portion of the linking shaft 82. The spring receiving member 84 is formed in a substantially annular plate shape with the upper-lower direction as the thickness direction. The linking shaft 82 is fit into the spring receiving member 84 and the spring receiving member 84 is fixed to the linking shaft 82.

The adjuster 86 is formed in a substantially cylindrical shape with the upper-lower direction as the axial direction, and disposed coaxially with the linking shaft 82 on the lower side of the spring receiving member 84. In addition, the lower end of the linking shaft 82 is inserted into the upper end of the adjuster 86, and the adjuster 86 is rotatably supported by the linking shaft 82. A linking pin 87 is provided at the lower end of the linking shaft 82, and a linked state of the adjuster 86 to the linking shaft 82 is maintained by the linking pin 87. A female screw thread is formed on the lower part of the inner circumferential surface of the adjuster 86. In addition, a groove part 86A is formed at a lower end side portion of the adjuster 86. The groove part 86A is open toward the radially outer side of the adjuster 86, and extends throughout the entire circumference in the circumferential direction of the adjuster 86. Accordingly, the lower end of the adjuster 86 protrudes radially outward with respect to the groove part 86A.

The stopper plate 88 is formed in a substantially annular plate shape with the upper-lower direction as the plate thickness direction. In addition, the lower end of the linking shaft 82 is inserted into the stopper plate 88, and the stopper blade 88 is disposed between the spring receiving member 84 and the adjuster 86. An abutting piece 88A extending toward the rear side is integrally formed with the stopper blade 88. In addition, the tip end (rear end) of the abutting piece 88A abuts against the upper surface of the guide rail 30E of the ejection part body 30B in the nose 30. Accordingly, the downward movement of the push lever unit 81 at the initial position is limited.

Figure 10:
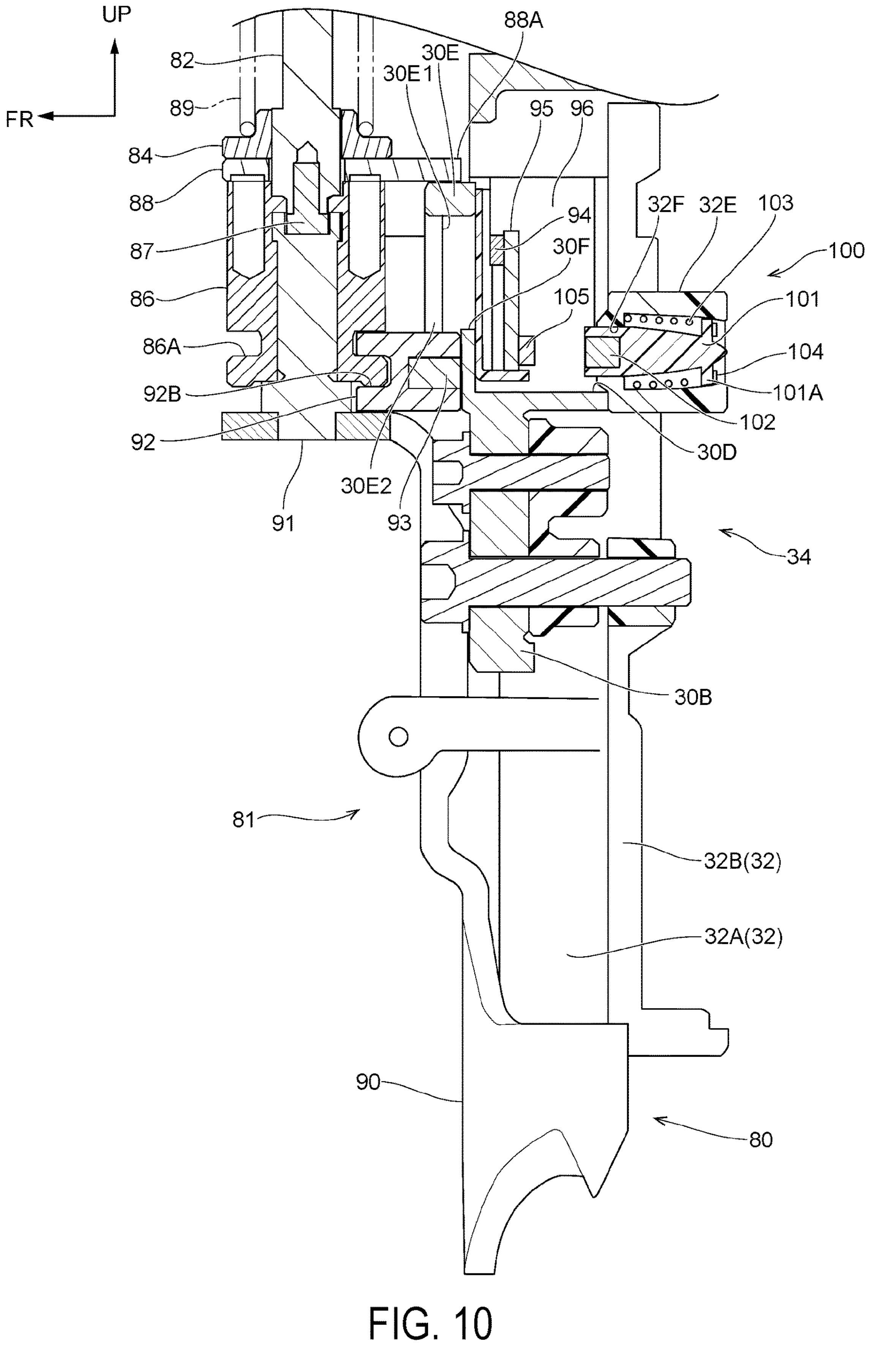
FIG. 10 is a cross-sectional view illustrating a portion of the periphery of the ejection part shown in FIG. 9 when viewed from the right side.
Figure 11:
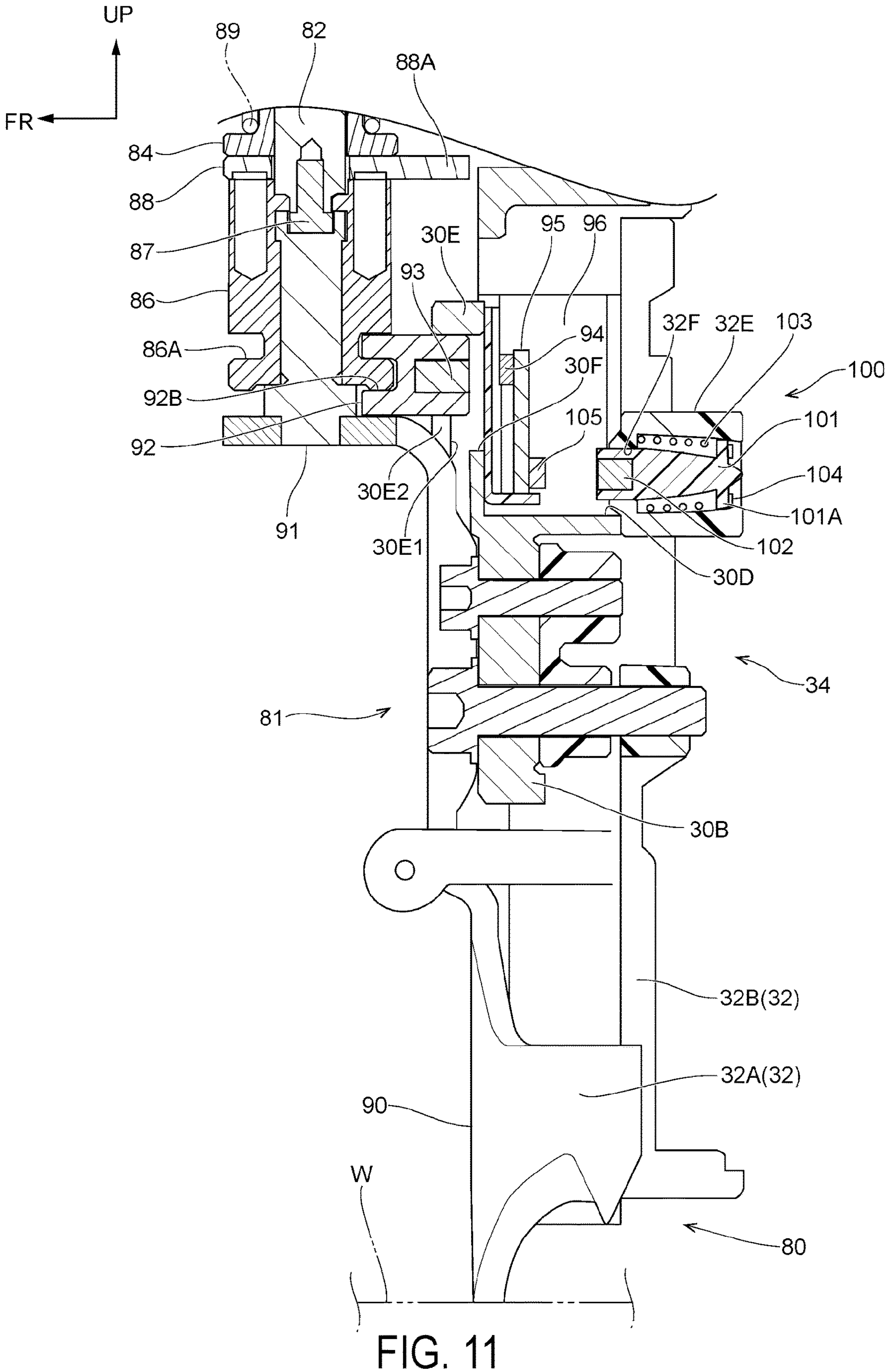
FIG. 11 is a cross-sectional view illustrating a state in which a push lever unit shown in FIG. 10 is moved toward the upper side and disposed at a permission position when viewed from the right side.

In addition, a push spring 89 (an element construed as a press biasing member in a broad sense, see FIGS. 3 and 10) is installed to the linking shaft 82. The push spring 89 is configured as a compression coil spring. The upper end of the push spring 89 is locked to the support cylinder 83, the lower end of the push spring 89 is locked to the spring receiving member 84, and the push spring 89 biases the push lever unit 81 toward the lower side. Accordingly, the push lever unit 81 is held at the initial position.

The push lever 90 forms the lower part of the push lever unit 81. The push lever 90 is formed with the front-rear direction as the plate thickness direction, and is formed in a substantially elongated shape extending in the upper-lower direction. The upper end of the push lever 90 is bent to be disposed on the lower side of the adjuster 86. An adjustment shaft 91 protruding toward the upper side is provided at the upper end of the push lever 90. The adjustment shaft 91 is formed in a substantially cylindrical columnar shape with the upper-lower direction as the axial direction, and a male screw thread is formed on the outer circumferential part of the adjustment shaft 91. In addition, the adjustment shaft 91 is inserted into the adjuster 86 from the lower side, and is screwed with the inner circumferential surface of the adjuster 86.

Accordingly, the push lever 90 is linked with the adjuster 86 through screw connection. Accordingly, it is configured that the push lever 90 moves relatively with respect to the adjuster 86 in the upper-lower direction by rotating the adjuster 86 about the axis. That is, it is configured that, by rotating the adjuster 86, the push lever unit 81 is configured to extend and contract in the upper-lower direction.

When viewed from the lower side, the lower end of the push lever 90 is formed in a substantially U shape open toward the rear side. The blade guide 32 is inserted into the lower end of the push lever 90 to be relatively movable in the upper-lower direction. That is, the lower end of the push lever 90 is linked with the blade guide 32 to be relatively movable.

In addition, at the initial position of the push lever unit 81, the lower end of the push lever 90 protrudes toward the rear side with respect to the ejection part 34 (the blade guide 32). In addition, as described above, by rotating the adjuster 86 about the axis, the push lever 90 is relatively movable in the upper-lower direction with respect to the adjuster 86. Therefore, it is configured that, with the adjuster, the protrusion amount of the push lever 90 at the initial position is adjustable. Moreover, by resisting the biasing force of the push spring 89 to move the push lever 90 toward the upper side, the push lever unit 81 is set to be disposed at the permission position. That is, it is configured that the movement distance from the initial position of the push lever 90 to the permission position changes in accordance with the protrusion amount of the push lever 90. Accordingly, it is configured to adjust the driving depth of the nail N into the driven material W.

As shown in FIGS. 12 and 13, the detection slider 92 is made of metal or resin, and is formed in a substantially T-shaped block shape when viewed from the upper side. Specifically, the detection slider 92 has a pair of flange parts 92A in the left and right. The flange parts 92A are formed in a substantially rectangular shape with the front-rear direction as the plate thickness direction, and protrude toward the outer sides in the left-right direction from the rear end of the detection slider 92. In addition, the rear end of the detection slider 92 is inserted into the guide groove 30E1 of the guide rail 30E in the ejection part 34, and is linked with the ejection part body 30B to be relatively movable in the upper-lower direction. In addition, in the linked state of the detection slider 92 to the ejection part body 30B, the relative movement of the detection slider 92 in the front-rear direction and the left-right direction is limited by the guide rail 30E.

A linking groove 92B open to the front side is formed on the front surface of the detection slider 92, and the linking groove 92B extends in the left-right direction and penetrates in the left-right direction. In addition, the lower end of the adjuster 86 is inserted into the linking groove 92B, and the groove part 86A of the adjuster 86 is engaged with the linking groove 92B in the upper-lower direction. Accordingly, the detection slider 92 and the adjuster 86 are linked to be integrally movable in the upper-lower direction, and the adjuster 86 is configured to be relatively rotatable with respect to the detection slider 92.

In addition, a magnet 93 is buried in the rear part of the detection slider 92. The magnet 93 is formed in a substantially cylindrical columnar shape with the front-rear direction as the axial direction. In addition, at the permission position of the push lever unit 81, the magnet 93 is set to be disposed to be opposite to the front side of the sensor hole 30F of the ejection part 34 (see FIG. 11).

The lever position sensor 94 is provided at the sensor substrate 95 as a detection substrate accommodated in the substrate accommodation part 30D of the ejection part 34. The sensor substrate 95 is formed in a substantially rectangular shape with the front-rear direction as the plate thickness direction, and is attached to the ejection part body 30B via a substrate holder 96 made of resin. The lever position sensor 94 is provided at the upper part of the front surface (second surface) of the sensor substrate 95, and is disposed on the rear side of the sensor hole 30F. The lever position sensor 94 is a magnetic sensor configured as a Hall element, and is electrically connected with the control unit 20. In addition, it is configured that, at the permission position of the push lever unit 81, the magnet 93 is opposite to the lever position sensor 94 in the front-rear direction via the sensor hole 30F. Accordingly, it is configured that the lever position sensor 94 outputs a detection signal to the control unit 20 in accordance with the magnetic flux density of the magnet 93, and the control unit 20 detects the permission position of the push lever unit 81 based on the detection signal of the lever position sensor 94.

(Regarding the blank firing mechanism 100) As shown in FIGS. 9 to 13, the blank firing mechanism 100 is configured as including a feeder detection lever 101 as a feeder detected part and a feeder position sensor 105 as a feeder detection part. The feeder detection lever 101 is formed in a substantially cylindrical columnar shape, and is accommodated in the lever accommodation part 32E along the axial direction of the lever accommodation part 32E of the ejection part body 30B. The front end side portion of the feeder detection lever 101 is configured as being inserted into the insertion hole 32F of the lever accommodation part 32E, and being relatively movable in the axial direction. That is, the feeder detection lever 101 is configured to be relatively movable in a direction approaching or separating from the sensor substrate 95. Specifically, the feeder detection lever 101 is configured to move between a apart position that is most apart with respect to the sensor substrate 95 (the position indicated in FIG. 13) and a close position (the position indicated in FIG. 12) close to the sensor substrate 95 from the apart position.

A flange part 101A projecting radially outward is formed at the rear end of the feeder detection lever 101. In addition, the flange part 101A abuts against a stopping wheel 104 provided at the opening part of the lever accommodation part 32E from the front side, and the rearward movement of the feeder detection lever 101 at the apart position is limited. In addition, a return spring 103 as a biasing member configured as a compression coil spring is installed to the feeder detection lever 101. The front end of the return spring 103 is locked to the front wall of the lever accommodation part 32E, the rear end of the return spring 103 is locked to the flange part 101A, and the return spring 103 biases the feeder detection lever 101 toward the rear side (the side of the apart position). Accordingly, the feeder detection lever 101 is held at the apart position.

In addition, at the apart position of the feeder detection lever 101, the rear end of the feeder detection lever 101 protrudes toward the rear side from the lever accommodation part 32E, and is disposed in the front end of the second guide rail 62B of the magazine case 62. In addition, when the feeder 64 of the magazine 60 is disposed at the prohibition position, the feeder detection lever 101 is configured to be pressed toward the front side by the feeder 64 and disposed at the close position.

A magnet 102 is buried in the front end of the feeder detection lever 101. The magnet 102 is formed in a substantially cylindrical columnar shape disposed coaxially with the feeder detection lever 101. The front surface of the magnet 102 is flush with the front surface of the feeder detection lever 101 and exposed to the front side.

The feeder position sensor 105 is provided at the lower part of the rear surface (first surface) of the sensor substrate 95 and disposed on the front side of the feeder detection lever 101. Specifically, in the axial direction of the feeder detection lever 101, the magnet 102 and the feeder position sensor 105 are disposed to be opposite to each other. In addition, when viewed in the inclination direction, the feeder position sensor 105 is disposed to overlap the magazine case 62. The feeder position sensor 105, like the lever position sensor 94, is a magnetic sensor configured as a Hall element and electrically connected with the control unit 20. Accordingly, it is configured that the feeder position sensor 105 outputs a detection signal to the control unit 20 in accordance with the magnetic flux density of the magnet 102, and the control unit 20 detects the close position of the feeder detection lever 101 based on the detection signal of the feeder position sensor 105.

(Regarding the operation of the driving tool 10) In the following, the operation of the driving tool 10 is described. In the non-operation state of the driving tool 10, the push lever unit 81 is disposed at the initial position, and the lower end of the push lever 90 protrudes toward the lower side with respect to the blade guide 32 of the ejection part 34. In addition, the magnet 93 of the driving depth adjustment mechanism 80 is disposed on the lower side with respect to the lever position sensor 94, and the control unit 20 detects the initial position of the push lever 90 based on the detection signal of the lever position sensor 94. In addition, the control unit 20 detects non-operation of the trigger 24 based on an output signal of the trigger switch.

Moreover, when detecting the initial position of the push lever 90 or the non-operation of the trigger 24, the control unit 20 stops (prohibits) the driving with respect to the motor 52. Therefore, in the non-operation of the driving tool 10, the driving of the motor 52 is stopped. In addition, in the state, the pinion pins 57 and the rack parts 48A are engaged, and the striking part 44 is disposed at the idling position between the lower dead center and the upper dead center. In addition, at the idling position, the lower end of the striking part 44 is disposed at a position corresponding to the intermediate part of the nail N in the upper-lower direction, and the nail N is not supplied into the ejection path 32C.

In addition, when detecting the permission position of the push lever unit 81 and an operation with respect to the trigger 24, the control unit 20 drives the motor 52. Specifically, when the driving tool 10 is pushed toward the lower side (the side of the driven material W), the push lever unit 81 resists the biasing force of the push spring 90 to move from the initial position toward the upper side. Accordingly, the detection slider 92 and the push lever unit 81 move toward the upper side together. In addition, when the push lever unit 81 arrives at the permission position, the magnet 93 and the lever position sensor 94 are disposed to be opposite to each other in the front-rear direction, and the control unit 20 detects the permission position of the push lever unit 81. In addition, the control unit 20 detects the operation of the trigger 24 based on an output signal from the trigger switch.

When the motor 52 drives, the pin wheel 56 is rotated by the driving force of the motor 52 to raise the striking part 44 to the upper dead center. In addition, at the upper dead center of the striking part 44, the engagement state of the pinion pins 57 and the rack parts 48A is removed. Moreover, in such state, the lower end of the driver blade 48 is disposed on the upper side with respect to the nail N, and the nail N is supplied into the ejection path 32C. In addition, the striking part 44 is lowered to the lower dead center by the pressure of the pressure chamber 42B and strikes the nail N toward the lower side. Accordingly, the nail N is emitted toward the lower side from the ejection part 34, and is driven into the driven material W.

The control unit 20 drives the motor 52 even after the nail N is struck into the driven material W. Therefore, the pinion pins 57 and the rack parts 48A are engaged again, and the striking part 44 is raised from the lower dead center to be disposed at the idling position. A position sensor (not shown) detecting the upper-lower position of the striking part 44 is connected to the control unit 20, and the control unit 20 detects the idling position of the striking part 44 based on the output signal from the position sensor. In addition, when detecting the arrival of the striking part 44 at the idling position, the control unit 20 stops the motor 52.

(Effects) In the following, the operation of the blank firing mechanism 100 is described together with the description of the effects of the embodiment.

In the state in which the number of the nails N filled in the magazine 60 is greater than the predetermined number, due to the nails N, the feeder 64 is disposed to be apart toward the other side in the inclination direction with respect to the ejection part 34. Specifically, as shown in FIG. 13, the pressing part 64A of the feeder 64 is disposed to be apart toward the other side in the inclination direction with respect to the rear end of the feeder detection lever 101 disposed at the apart position. Accordingly, based on the detection signal from the feeder position sensor 105, the control unit 20 detects the apart position of the feeder detection lever 101. That is, the control unit 20 detects that the nails N are filled in the magazine 60, instead of detecting that the remaining number of the nails N filled in the magazine 60 is less than or equal to the predetermined number. Therefore, the control unit 20 sets the driving tool 10 to an operation permitted state.

Every time when the driving tool 10 operates and the nail N is supplied to the ejection part 34, the feeder 64 moves to the side of the inclination direction due to the biasing force of the biasing spring. In addition, when the remaining number of the nails N in the magazine 60 is less than or equal to the predetermined number, the feeder 64 is disposed at the prohibition position. At this time, the pressing part 64A of the feeder 64 abuts against an end of the feeder detection lever 101 and moves further to the side of the inclination direction from the abutting position. Accordingly, as shown in FIG. 12, the feeder detection lever 101 resists the biasing force of the return spring 103 and moves toward the front side to be disposed at the close position. Therefore, the magnet 102 approaches the feeder position sensor 105. As a result, based on the detection signal of the feeder position sensor 105, the control unit 20 detects the close position of the feeder detection lever 101. In other words, the control unit 20 detects that the remaining number of the nails N filled in the magazine 60 is equal to or less than the predetermined number. Therefore, the control unit 20 sets the driving tool 10 to an operation prohibited state. That is, the driving with respect to the motor 52 is prohibited. Therefore, blank firing in the driving tool 10 is avoided.

As described above, in the driving tool 10 of the embodiment, the feeder 64 is movably provided in the magazine case 62, and by moving the feeder 64 to a side of the inclination direction, the nail N filled in the magazine case 62 is supplied to the ejection part 34. In addition, in the case where the remaining number of the nails N in the magazine case 62 is less than or equal to the predetermined number, the feeder 64 is disposed at the prohibition position.

Here, the blank firing mechanism 100 is provided with the feeder position sensor 105 detecting the position of the feeder 64 of the magazine 60. Specifically, the feeder position sensor 105 is configured to be able to detect the movement of the feeder 64 to the prohibition position. When the control unit 20 detects the prohibition position of the feeder 64 based on the detection signal of the feeder position sensor 105, the control unit 20 prohibits the driving of the motor 52. Thus it is possible to prevent blank firing of the striking part 44. The feeder position sensor 105 is provided to the ejection part 34. Thus, for example, it is unnecessary for a wire, which connects the control unit 20 and the feeder position sensor 105, to be extended to the outside of the housing 14, in comparison with a structure in which the feeder position sensor 105 is provided in the magazine case 62 of the magazine 60. Therefore, compared with the above configuration, the blank firing of the nails N can be prevented by using a simple configuration.

In addition, the feeder position sensor 105 is disposed at a position overlapped with the feeder 64 when viewed in the inclination direction. Specifically, the feeder position sensor 105 is disposed on a side in the inclination direction with respect to the feeder 64. Therefore, compared with the configuration in which the feeder position sensor 105 does not overlap the feeder 64 when viewed in the inclination direction 64, the size of the blank firing mechanism 100 can be reduced, and the size of the ejection part 34 can be reduced. In addition, the inclination direction corresponds to the second direction of the invention.

In addition, the feeder detection lever 101 is provided at the ejection part 34 (the blade guide 32), and the feeder detection lever 101 is configured to be relatively movable in the direction of approaching and separating from the feeder position sensor 105. Moreover, the feeder detection lever 101 is disposed at the apart position apart with respect to the feeder position sensor 105 by using the return spring 103. In addition, by moving the feeder 64 to the prohibition position, the feeder detection lever 101 is moved to the close position close to the feeder position sensor 105 by using the feeder 64, and the feeder position sensor 105 detects the prohibition position of the feeder 64. Therefore, for example, compared with the configuration in which the feeder detection lever 101 is omitted, the magnet 102 is provided at the feeder 64, and the feeder position sensor 105 detects the approaching of the feeder 64, the feeder position sensor 105 can be suppressed from being exposed to the outside. That is, the exposure of the feeder position sensor 105 to the outside can be suppressed by the feeder detection lever 101. Accordingly, the protective performance of the feeder position sensor 105 can be facilitated. In addition, in the case of a configuration where the feeder detection lever 101 is omitted, the magnet 102 is provided at the feeder 64, and the feeder position sensor 105 detects the approaching of the feeder 64, since the magazine case 62 and the nose 30, which are relatively large components, are interposed between the feeder position sensor 105 and the feeder 64, the manufacturing tolerance may be increased, and it is possible that the feeder position sensor 105 is unable to accurately detect the approaching of the feeder 64. Comparatively, according to the embodiment, since only the lever accommodation part 32 and the nose 30, which are relatively small components, are interposed between the feeder position sensor 105 and the feeder detection lever 101, the manufacturing tolerance is reduced, and the feeder position sensor 105 can accurately detect the approaching of the feeder 64.

Moreover, by configuring the feeder 64 and the feeder detection lever 101 as separate components, when the feeder 64 is moved to the prohibition position, it is not required to insert the feeder 64 into the ejection part 34. Accordingly, the feeder 64 is arranged in a simple shape, and the size of the feeder 64 can be reduced.

Moreover, the driving depth adjustment mechanism 80 for regulating the driving depth of the nail N into the driven material W is provided at the ejection part 34. The driving depth adjustment mechanism 80 is configured as including the push lever unit 81 configured to be movable in the upper-lower direction and the lever position sensor 94 detecting the upper-power position of the push lever unit 81. In addition, when the control unit 20 detects the initial position of the push lever unit 81 by using the lever position sensor 94, the driving of the motor 52 is prohibited to prohibit the striking of the striking part 44 to the nail N. Meanwhile, when the control unit 20 detects the permission position of the push lever unit 81 by using the lever position sensor 94, the driving of the motor 52 is permitted to permit the striking of the striking part 44 to the nail N. Accordingly, the driving depth adjustment mechanism 80 adjusting the driving depth of the nail N to the driven material W and the blank firing mechanism 100 detecting the remaining number of the nails N and preventing blank firing can be compactly disposed in the ejection part 34.

Moreover, the lever position sensor 94 of the driving depth adjustment mechanism 80 and the feeder position sensor 105 of the feeder 64 of the blank firing mechanism 100 are provided at the sensor substrate 95. That is, the sensor substrate 95 is configured as a common substrate of the lever position sensor 94 and the feeder position sensor 105. Accordingly, compared with the configuration in which the lever position sensor 94 and the feeder position sensor 105 are provided at separate substrates, the size of the ejection part 34 can be reduced, and the structure of the ejection part 34 can be simple.

In addition, the feeder position sensor 105 is provided on the rear surface of the sensor substrate 95, and the lever position sensor 94 is provided on the front surface of the sensor substrate 95. Accordingly, on the two sides of the sensor substrate 95 in the plate thickness direction, the positions of the feeder 64 and the push lever 90 can be respectively detected. Accordingly, a configuration in which the efficiency with respect to the driving depth adjustment mechanism 80 and the blank firing prevention mechanism 100 is favorable can be realized in the ejection part 34.

In addition, the push lever unit 81 is linked with the detection slider 92. The detection slider 92 is configured to be integrally movable in the upper-lower direction with the push lever unit 81. In addition, the lever position sensor 94 detects the movement of the detection slider 92 to the permission position. Moreover, the upper-lower movement of the detection slider 92 is guided by the guide rail 30E of the ejection part 34. Specifically, the guide rail 30E is provided with the pair of rail parts 30E2 on the left and right, and a portion of the detection slider 92 is disposed between the pair of guide rails 30E2. Accordingly, the backlash of the detection slider 92 in the left-right direction can be suppressed by the guide rail 30E. Therefore, the position of the push lever unit 81 can be accurately detected by the lever position sensor 94. In addition, the left-right direction corresponds to the third direction of the invention.

In addition, the guide groove 30E1 is formed in the guide rail 30E, and the detection slider 92 is engaged with the guide groove 30E1 in the front-rear direction (the plate thickness direction of the sensor substrate 95) to limit the movement of the detection slider 92 in the front-rear direction. Accordingly, the backlash of the detection slider 92 in the front-rear direction can be suppressed by the guide rail 30E. Therefore, the position of the push lever unit 81 can be accurately detected by the lever position sensor 94.

In addition, in the driving depth adjustment mechanism 80, the lower end of the adjuster 86 is inserted into the linking groove 92B of the detection slider 92, and the groove part 86A of the adjuster 86 and the linking groove 92B are engaged in the upper-lower direction. Accordingly, the detection slider 92 and the adjuster 86 are linked to be integrally movable in the upper-lower direction, and the adjuster 86 is configured to be relatively rotatable with respect to the detection slider 92. Therefore, the relative positions between the stopper blade 88 and the push lever 90 in the upper-lower direction are adjusted by the adjuster, while the detection slider 92 and the adjuster 86 can be linked to be integrally movable.

In the embodiment, in the case where the remaining number of the nails N is less than or equal to the predetermined number, the slider 64 is disposed at the prohibition position, and the blank firing of the striking part 44 is prevented by the blank firing prevention mechanism 100. However, the remaining number of the nails N for the prohibition position of the feeder 64 can be set arbitrarily.

REFERENCE SIGNS LIST

10: Driving tool (work machine); 12: Driving tool body (body part); 20: Control unit; 34: Ejection part; 44: Striking part; 60: Magazine; 62: Magazine case (case); 64: Feeder; 81: Push lever unit (pressing part); 86: Adjuster (adjustment member); 88: Stop blade (second pressing part); 90: Push lever (first pressing part); 92: Detection slider (pressing detected part); 93: Magnet;

94: Lever position sensor (pressing detection part); 95: Sensor substrate (detection substrate); 101: Feeder detection lever (feeder detected part); 103: Return spring (biasing member); 105: Feeder position sensor (feeder detection part); N: Nail (Fastener).

What is claimed is:

1. A work machine, comprising:
- a body part, having an ejection part to which a fastener is supplied;
- a striking part, striking the fastener held by the ejection part by moving toward a side of a first direction;
- a magazine part, having: a case attached to the ejection part and accommodating the fastener; and a feeder provided in the case to be movable in a second direction intersecting with the first direction and moving to a side of the second direction, thereby supplying the fastener to the ejection part;
- a feeder detection part, detecting a position of the feeder;
- a pressing part, provided to be movable in the first direction;
- a pressing detection part, configured to be able to detect a position of the pressing part in the first direction; and
- a control unit, controlling driving of the striking part by using a detection result of the feeder detection part and the pressing detection part,
- wherein the feeder detection part and the pressing detection part are accommodated in a common accommodation part provided at the ejection part,
- the ejection part has an ejection path through which the striking part and the fastener pass when the striking part strikes the fastener,
- at least a part of the pressing part is located on one side of the injection path in the second direction,
- at least a part of the feeder is located on the other side of the injection path in the second direction, and
- the accommodation part is disposed so as to overlap the ejection path in a direction perpendicular to the first direction and the second direction.

2. The work machine as claimed in claim 1, wherein the feeder detection part is disposed at a position overlapped with the feeder when viewed in the second direction.

3. The work machine as claimed in claim 1, wherein
- the control unit is configured to:
- when detecting that the pressing part is located at an initial position protruding toward the side of the first direction from the ejection part based on a detection signal of the pressing detection part, prohibit the striking of the striking part; and
- when detecting that the pressing part is located at a permission position displaced from the initial position toward an other side of the first direction based on the detection signal of the pressing detection part, permit the striking of the striking part.

4. The work machine as claimed in claim 3, wherein a pressing detected part is linked with the pressing part to be integrally movable in the first direction, and the pressing detection part detects a movement of the pressing detected part to the permission position, and
- the ejection part is provided with a guide part guiding a movement of the pressing detected part toward the first direction.

5. The work machine as claimed in claim 4, wherein the pressing detected part is provided with a magnet, and
- the pressing detection part is a magnetic sensor and detects the permission position of the pressing part by detecting approaching of the magnet.

6. The work machine as claimed in claim 4, wherein the pressing part is configured by comprising:
- a first pressing part, abutting against a driven material at a time of striking of the fastener;
- a second pressing part, abutting against the ejection part at the initial position to stop a movement of the pressing part toward the side of the first direction; and
- an adjustment member, changing relative positions between the first pressing part and the second pressing part in the first direction,
- wherein the pressing detected part is linked with the adjustment member to be integrally movable in the first direction.

7. The work machine as claimed in claim 1, wherein the feeder detection part and the pressing detection part are provided at a detection substrate.

8. The work machine as claimed in claim 7, wherein the feeder detection part is provided on a first surface of the detection substrate, and the pressing detection part is provided on a second surface of the detection substrate.

9. A work machine, comprising:
- a body part, having an ejection part to which a fastener is supplied;
- a striking part, striking the fastener held by the ejection part by moving toward a side of a first direction;
- a magazine part, having: a case attached to the ejection part and accommodating the fastener; and a feeder provided in the case to be movable in a second direction intersecting with the first direction and moving to a side of the second direction, thereby supplying the fastener to the ejection part;
- a feeder detection part, detecting a position of the feeder;
- a pressing part, provided to be movable in the first direction;
- a pressing detection part, configured to be able to detect a position of the pressing part in the first direction; and
- a control unit, controlling driving of the striking part by using a detection result of the feeder detection part and the pressing detection part,
- wherein the feeder detection part and the pressing detection part are accommodated in a common accommodation part provided at the ejection part,
- wherein the control unit prohibits striking of the striking part when the feeder detection part detects that the feeder is at a prohibition position,
- at the ejection part, a feeder detected part is provided to be relatively movable in a direction of moving close to and apart from the feeder detection part,
- the feeder detected part is disposed at a apart position apart from the feeder detection part by being biased by a biasing member, and, with the feeder moving to the prohibition position, moves to a close position close to the feeder detection part, and
- by detecting that the feeder detected part is at the close position, the feeder detection part detects that the feeder is at the prohibition position.

10. The work machine as claimed in claim 9, wherein the feeder detected part is disposed between the feeder and the feeder detection part,
- with the feeder pressing the feeder detected part when the feeder moves toward the prohibition position, the feeder detected part is moved from the apart position toward the close position.

11. A work machine, comprising:
- a body part, having an ejection part to which a fastener is supplied;

a striking part, striking the fastener held by the ejection part by moving toward a side of a first direction;

a magazine part, having: a case attached to the ejection part and accommodating the fastener; and a feeder provided in the case to be movable in a second direction intersecting with the first direction and moving to a side of the second direction, thereby supplying the fastener to the ejection part;

a feeder detection part, detecting a position of the feeder;

a pressing part, provided to be movable in the first direction;

a pressing detection part, configured to be able to detect a position of the pressing part in the first direction; and a control unit, controlling driving of the striking part by using a detection result of the feeder detection part and the pressing detection part, wherein the feeder detection part and the pressing detection part are accommodated in a common accommodation part provided at the ejection part, wherein the control unit is configured to:

when detecting that the pressing part is located at an initial position protruding toward the side of the first direction from the ejection part based on a detection signal of the pressing detection part, prohibit the striking of the striking part; and when detecting that the pressing part is located at a permission position displaced from the initial position toward an other side of the first direction based on the detection signal of the pressing detection part, permit the striking of the striking part, wherein a pressing detected part is linked with the pressing part to be integrally movable in the first direction, and the pressing detection part detects a movement of the pressing detected part to the permission position, and the ejection part is provided with a guide part guiding a movement of the pressing detected part toward the first direction, wherein the guide part has a pair of rail parts, the pair of rail parts extend in the first direction and are disposed to be opposite to each other in a third direction orthogonal to the first direction, and a portion of the pressing detected part is disposed between the pair of rail parts in the third direction.

* * * * *